US011223584B2

(12) United States Patent
Nguyen et al.

(10) Patent No.: US 11,223,584 B2
(45) Date of Patent: *Jan. 11, 2022

(54) AUTOMATIC ACTION RESPONSES

(71) Applicant: MICROSOFT TECHNOLOGY LICENSING, LLC, Redmond, WA (US)

(72) Inventors: Amy Huyen Phuoc Nguyen, Bellevue, WA (US); Chia-Jung Lee, Kirkland, WA (US); Ivan Valeryevich Zhiboedov, Kenmore, WA (US); Philipp Cannons, Seattle, WA (US); Rachel Imogen Solimeno, Seattle, WA (US); Dong Hwi Yoo, Issaquah, WA (US); Yamin Wang, Bellevue, WA (US); Milad Shokouhi, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,374

(22) Filed: Dec. 17, 2020

(65) Prior Publication Data

US 2021/0112022 A1 Apr. 15, 2021

Related U.S. Application Data

(63) Continuation of application No. 15/620,671, filed on Jun. 12, 2017, now Pat. No. 10,873,545.

(51) Int. Cl.
*H04L 12/58* (2006.01)
*G06F 16/23* (2019.01)
(Continued)

(52) U.S. Cl.
CPC .......... *H04L 51/02* (2013.01); *G06F 16/2365* (2019.01); *G06F 16/3329* (2019.01); *G06N 20/00* (2019.01); *G06Q 10/107* (2013.01)

(58) Field of Classification Search
None
See application file for complete search history.

(56) References Cited

U.S. PATENT DOCUMENTS

| 5,109,413 A | * | 4/1992 | Comerford | ......... G06F 12/1408 |
| | | | | 705/54 |
| 6,505,167 B1 | * | 1/2003 | Horvitz | ................ G06Q 10/109 |
| | | | | 705/7.21 |

(Continued)

OTHER PUBLICATIONS

"Definition—What does Device Mean?", Retrieved From: https://www.techopedia.com/definition/2185/device, Nov. 8, 2012, 2 Pages.

(Continued)

*Primary Examiner* — Backhean Tiv
(74) *Attorney, Agent, or Firm* — Shook, Hardy & Bacon L.L.P.

(57) ABSTRACT

Systems and methods are provided that automatically process message input and provide action responses according to the processing results. The automatic action response system may leverage at least one machine-learning algorithm that is trained using a dataset. The provided action responses may comprise of default action responses and/or intelligent action responses that are based at least in part on prior conversational data between a user and a sender. Some intelligent action responses may include text-based replies, which eliminate the need for a user to type a reply on a device screen, thereby saving previous time, conserving device battery life, and preserving the integrity of the device hardware. A portion of a message may be highlighted manually by a user or automatically by the action response system to initiate the automatic action response system. In (Continued)

this way, a more efficient and productive user experience across various devices and applications is achieved.

20 Claims, 14 Drawing Sheets

(51) Int. Cl.
  *G06Q 10/10* (2012.01)
  *G06N 20/00* (2019.01)
  *G06F 16/332* (2019.01)

(56) References Cited

U.S. PATENT DOCUMENTS

| | | | | |
|---|---|---|---|---|
| 6,598,017 | B1* | 7/2003 | Yamamoto | G10L 15/1815 704/235 |
| 7,136,710 | B1* | 11/2006 | Hoffberg | H04N 21/252 700/83 |
| 7,158,980 | B2* | 1/2007 | Shen | G06Q 10/107 |
| 7,580,719 | B2* | 8/2009 | Karmarkar | H04L 51/38 370/328 |
| 7,584,253 | B2* | 9/2009 | Curbow | G06Q 10/107 709/206 |
| 7,636,701 | B2* | 12/2009 | Funge | A63F 13/67 706/47 |
| 8,032,477 | B1* | 10/2011 | Hoffberg | G06N 7/06 706/52 |
| 8,286,085 | B1* | 10/2012 | Denise | G06Q 10/107 715/752 |
| 8,385,975 | B2* | 2/2013 | Forutanpour | H04M 3/53391 455/558 |
| 8,423,577 | B1* | 4/2013 | Lee | G06Q 10/02 707/793 |
| 8,996,639 | B1* | 3/2015 | Faaborg | H04L 51/02 709/206 |
| 9,111,291 | B2* | 8/2015 | Lempel | G06Q 30/0276 |
| 9,213,941 | B2* | 12/2015 | Petersen | G06N 5/04 |
| 9,813,363 | B1* | 11/2017 | Caldwell | H04L 51/02 |
| 10,015,124 | B2* | 7/2018 | McGregor, Jr. | H04L 51/02 |
| 10,873,545 | B2* | 12/2020 | Nguyen | G06N 20/00 |
| 2002/0139839 | A1* | 10/2002 | Catan | G06F 16/38 235/375 |
| 2003/0177190 | A1* | 9/2003 | Moody | H04L 51/00 709/206 |
| 2007/0179776 | A1* | 8/2007 | Segond | G06F 16/332 704/9 |
| 2007/0244976 | A1* | 10/2007 | Carroll | G06Q 10/109 709/206 |
| 2008/0086455 | A1* | 4/2008 | Meisels | G01C 21/26 |
| 2008/0091406 | A1* | 4/2008 | Baldwin | G10L 25/51 704/4 |
| 2008/0115149 | A1* | 5/2008 | Rupp | G06F 11/302 719/318 |
| 2008/0233932 | A1* | 9/2008 | Sapp | G06Q 10/10 455/415 |
| 2009/0076795 | A1* | 3/2009 | Bangalore | G06F 40/30 704/9 |
| 2009/0119290 | A1* | 5/2009 | Lee | H04L 51/00 |
| 2009/0170486 | A1* | 7/2009 | Culbert | H04M 1/7243 455/415 |
| 2009/0235280 | A1* | 9/2009 | Tannier | G06Q 10/00 719/318 |
| 2010/0005087 | A1* | 1/2010 | Basco | G06F 16/951 707/E17.017 |
| 2010/0228710 | A1* | 9/2010 | Imig | G06F 16/9535 707/706 |
| 2012/0245944 | A1* | 9/2012 | Gruber | G10L 15/26 704/270.1 |
| 2012/0290511 | A1* | 11/2012 | Frank | G06N 20/00 706/12 |
| 2013/0007037 | A1* | 1/2013 | Azzam | G06F 16/3329 707/769 |
| 2013/0103624 | A1* | 4/2013 | Thieberger | G06Q 10/063 706/12 |
| 2013/0103692 | A1* | 4/2013 | Raza | G06Q 30/02 707/741 |
| 2013/0159220 | A1* | 6/2013 | Winn | G06Q 10/10 706/12 |
| 2014/0052680 | A1* | 2/2014 | Nitz | G06N 5/04 706/46 |
| 2014/0314225 | A1* | 10/2014 | Riahi | H04L 51/02 379/265.09 |
| 2015/0149896 | A1* | 5/2015 | Radhakrishnan | G06F 40/242 715/271 |
| 2015/0185995 | A1* | 7/2015 | Shoemaker | G06N 20/00 715/708 |
| 2015/0281149 | A1* | 10/2015 | Masterson | H04L 51/02 715/752 |
| 2015/0302301 | A1* | 10/2015 | Petersen | G06Q 10/107 706/11 |
| 2015/0310072 | A1* | 10/2015 | Dietz | G06F 16/22 707/741 |
| 2015/0340033 | A1* | 11/2015 | Di Fabbrizio | G10L 15/22 704/254 |
| 2016/0328681 | A1* | 11/2016 | Portnoy | G06Q 50/01 |
| 2016/0359771 | A1* | 12/2016 | Sridhar | H04L 51/02 |
| 2016/0379119 | A1* | 12/2016 | Kumar | G06F 11/3409 706/46 |
| 2017/0060844 | A1* | 3/2017 | He | G06F 40/30 |
| 2017/0132141 | A1* | 5/2017 | Allen | G06N 20/00 |
| 2018/0032997 | A1* | 2/2018 | Gordon | G06Q 30/0269 |
| 2018/0359199 | A1* | 12/2018 | Nguyen | H04L 51/02 |
| 2019/0050406 | A1* | 2/2019 | Nguyen | G06F 16/24535 |
| 2021/0112022 | A1* | 4/2021 | Nguyen | G06F 16/2365 |

OTHER PUBLICATIONS

"Final Office Action Issued in U.S. Appl. No. 15/672,095", dated Mar. 5, 2020, 46 Pages.

* cited by examiner

AUTOMATIC ACTION RESPONSES

CROSS-REFERENCE TO RELATED APPLICATIONS

This application entitled "Automatic Action Responses," is a continuation of U.S. application Ser. No. 15/620,671, entitled "Automatic Action Responses" and filed Jun. 12, 2017, the entirety of which is incorporated by reference herein.

BACKGROUND

Responding to electronic messages can be tedious and time-consuming. Specifically, replying to messages and posts on electronic mail applications, text messaging applications, discussion forums, blogs, etc., exhaust precious amounts of time in the day-to-day lives of many users and consume exorbitant amounts of technical resources, including device battery life and memory storage. Furthermore, by continuously using a keyboard, touchpad, or similar input mechanism for replying to a message, the input hardware (e.g., keyboard and mouse) will inevitably deteriorate over time. The average American worker spends an estimated 55% of their workday on tasks outside of their job role, including email, meetings, administrative tasks, and interruptions. In the same vain, it is estimated that 14% of the average workday is spent using email—nearly one-seventh of all time spent in the office. The 14% figure is even higher, e.g., 25%, of the workforce who receive more than 100 emails every day.

In many instances, users often recycle the same reply messages. However, the majority of current messaging applications require that the user re-input that same reply message to each subsequent message that warrants the same reply. No current application provides the user with a set of automatically generated replies and/or actions across multiple applications. Rather, the user is usually required to manually enter a reply or take an action in response to the received message, rather than allow a machine-learning algorithm to provide a set of suggested replies or actions. As a result, excessive amounts of time and resources are consumed during this process of monotonously taking actions (e.g., replying, attaching a document, creating a calendar event) in response to a received message.

The more time it takes to respond to logistical e-mails and recurrent text messages from a friend, the less time users spend in the real world. Conversely, the less time a user spends typing "See you soon" to a friend, the more time the user will have to actually enjoy the walk down the street to meet that friend. Spending less time responding to everyday messages via text messaging applications, blog posts, discussion forums, etc., inevitably leads to conserving significantly more battery life in a user's device. Additionally, spending less time typing on or touching an electronic device significantly decreases the amount of hardware deterioration of that device over time. Unfortunately, no current solutions exist to help curb these everyday repetitious processes that consumer valuable time and resources.

It is with respect to these and other general considerations that example aspects, systems, and methods have been described. Also, although relatively specific problems have been discussed, it should be understood that the examples should not be limited to solving the specific problems identified in the background.

SUMMARY

Providing users with automatic suggested responses and actions will allow users to be more productive throughout the day, as they will not be wasting precious minutes typing out responses to routine messages, such as logistical emails or text messages. Increasing worker productivity with smarter, faster replies and action responses is a method for spending less time in the inbox and on other messaging applications. Even the shortest emails require a handful of minutes, and this precious time adds up quickly. By expediting routine replies and actions, users can take back this lost time and be more productive in the workplace. More time will be spent on productive tasks and enjoying the real world, while less time will be spent on formulating and typing routine replies or taking repetitive actions. Such efficiency and productivity not only provides for a better overall user experience and happier workers, but it also provides for better utilization of technological resources, such as local memory storage, battery life, and hardware sustainability.

A processor-implemented method of providing action responses is disclosed herein. A portion of a message input from a computing device may be detected. The portion of the message input may then be tokenized. During the tokenizing step, the system may extract specific tokens from the message input data. A "token" may be characterized as any sequence of characters. It may be a single character or punctuation mark, a phrase, a sentence, a paragraph, multiple paragraphs, or a combination of the aforementioned forms. During the tokenization step, key words from the message input may be isolated and associated with general topics that may be preloaded into a natural language processor. These topics may be located in a preexisting matrix of data where certain tokens are associated with certain topics. After the tokenization step, one or more features may be extracted from the message input. Additionally, at least one domain classifier may be applied to the message input. The portion of the message input may then be converted into a semantic representation based on the determination of the domain classifier. An action response may then be determined according to the message input, the extracted features, the domain classification, and other data associated with the message input. The action response may then be automatically provided. The action response may be a pop-up next to a portion of text on a screen. In some example aspects, the action response may be an automatic underlining or highlighting of a portion of text. Other examples of action responses are disclosed herein. Finally, the portion of the message input, the extracted features, domain classifications, action response(s), and any other associated data may be stored in a database. Future cycles of providing action responses may rely on this stored data to generate more accurate and personalized action responses.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figure 1:
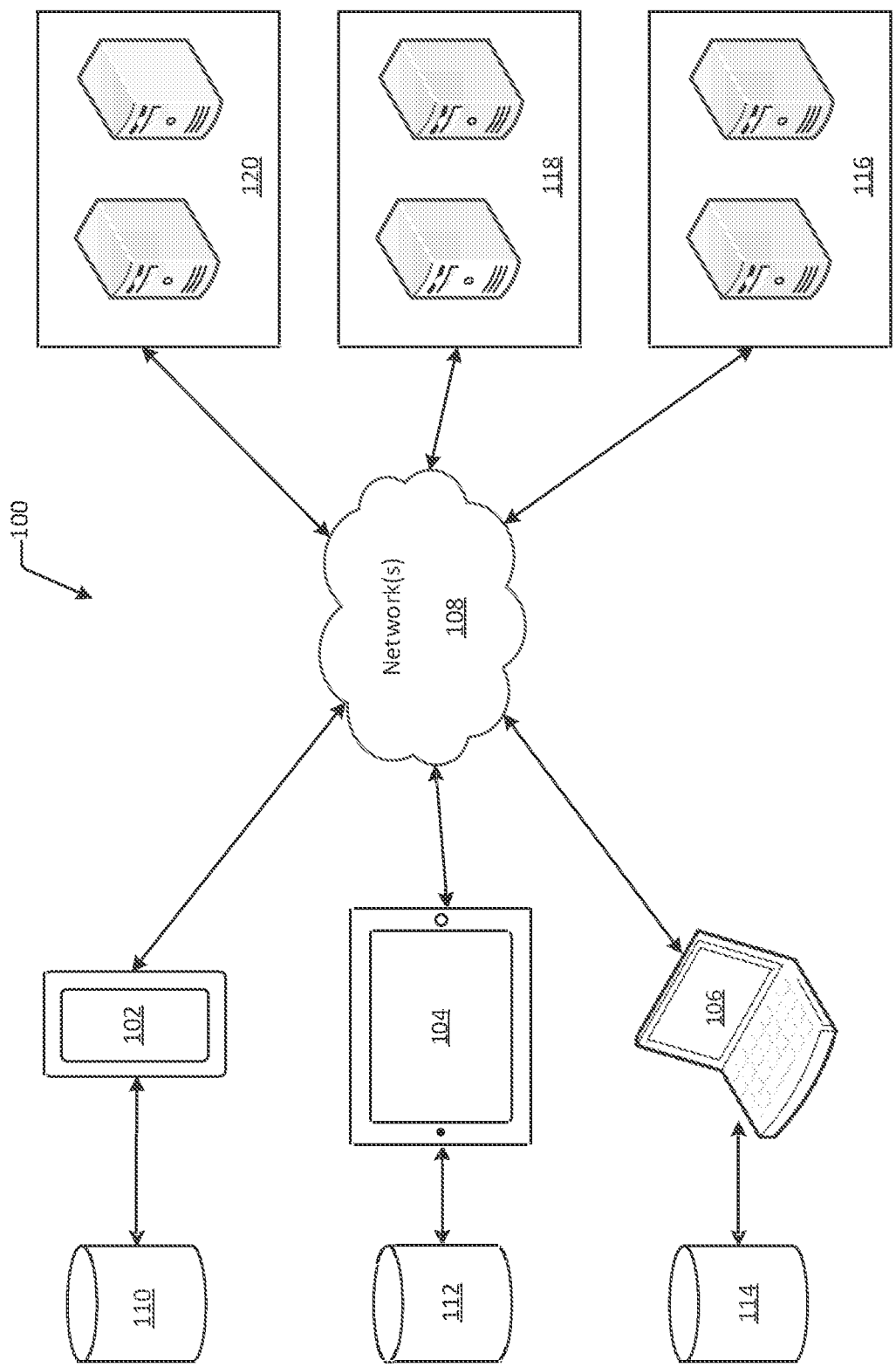
FIG. 1 illustrates an example of a distributed system for receiving and storing data related to providing intelligent action responses.

In the following detailed description, reference is made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents The average day-to-day routine of a worker largely consists of checking and responding to routine logistical emails. Not only do many people find themselves re-typing the exact same reply to multiple emails, but they also find themselves repeating mundane tasks within email applications, such as searching for and attaching pertinent documents. More broadly speaking, many people experience re-typing familiar text messages to their friends and family. For example, the phrases "See you soon" or "I love you" are common messages that are transmitted on a daily basis. In order to transmit these messages to friend or a loved one, a user is often times required to type in that message into a message dialog box each time. Consider an example of two people chatting with each another. One of the conversation participants receives a text message from his daughter regarding the location of where he should pick her up after school. Unsurprisingly, the conversation participant typically must pause the conversation with the other participant and type out a message to his daughter. Alternatively, if the conversation participant was utilizing an action response system, the conversation participant may be able to simply tap on the received text message from his daughter, thereby highlighting the most relevant portions of the received message. Based on these intelligent highlights, the action response system may provide suggested actions and/or responses to the conversation participant, which may be quickly selected with a single tap or touch. Thus, instead of interrupting a face-to-face conversation to unenthusiastically type out a frequently sent message about where the conversation participant will pick up his daughter, the conversation participant can simply select an intelligently suggested reply that contains the location where he will pick up his daughter and continue with his conversation.

In another example, consider the precious minutes that are wasted when navigating through folders to attach a document or graphic to an electronic mail message or a discussion forum. If the received message contains enough information about which document the sender wishes to receive, then an action response system may provide an intelligently suggested action of attaching the specifically requested document. Thus, a user will no longer have to navigate through folders and search through a file system for desired attachments. The action response system may automatically do that work for the user.

In addition to the abundant amounts of time that will be saved and ultimately translated into higher efficiency and productivity, the action response system may also significantly improve technological systems. For example, the disclosed system may be able to generate numerous intelligent replies and actions at a much faster rate than a human could generate manually. Such efficiencies may conserve electronic resources, like battery power, on the device side; and processing, memory and network resources on both the webpage/application provider side and the device side. Furthermore, utilizing a distributed system to process incoming message data and subsequently provide intelligently suggest action responses may allow memory to be more uniformly distributed across devices involved in the system, ultimately resulting in faster processing speeds and a more dynamic allocation of memory. Also, automatically identifying relevant words, phrases, sentences, paragraphs, etc., and automatically generating associated intelligent action responses reduces the amount of time users spend on their electronic devices, thereby preserving the longevity of the device hardware and reducing the demand for customer service resources. An automatic action response system, like the system disclosed herein, results in improved customer satisfaction, efficiency, and productivity throughout the day.

FIG. 1 illustrates an example of a distributed system for receiving and storing data related to providing intelligent action responses.

A system that facilitates providing real-time detection of relevant tokens (i.e., portions of character sequences, such as keywords, phrases, sentences, and paragraphs, etc.) and automatically suggests subsequent intelligent action responses may be run on an electronic device including, but not limited to, client devices such as a mobile phone 102, a tablet 104, and a personal computer 106. The disclosed system may receive message data from a messaging application, such as an electronic mail application or an SMS application, running on a device. The disclosed system may then process that message data locally, remotely, or using a combination of both. During processing, the disclosed system may rely on local and remote databases to generate the most appropriate intelligent action responses to provide back to the user. This may be accomplished by utilizing local data stored in a local database, remote database stored on servers 116, 118, and 120, or a combination of both.

For example, mobile phone 102 may utilize local database 110 and access servers 116, 118, and/or 120 via network(s) 108 to process the message data and provide an appropriate intelligent action response. In other example aspects, tablet 104 may utilize local database 112 and network(s) 108 to synchronize the relevant tokens extracted from the processed message data and the subsequent intelligent action responses across client devices and across all servers running the action response system. For example, if the initial message input data is received on tablet 104, the message input data and subsequent intelligent action response generation may be saved locally in database 112, but also shared with servers 116, 118, and/or 120 via the network(s) 108.

In other example aspects, the action response system may be employed locally. For instance, if the system servers 116, 118, and 120 are down, the action response system may still operate on a client device, such as mobile device 102, tablet 104, and computer 106. In this case, a subset of the trained dataset applicable to the client device type and at least a client version of the machine-learning algorithms may be locally cached so as to automatically respond to relevant tokens highlighted in the message data on the client device. The system servers 116, 118, and 120 may be down for a variety of reasons, including but not limited to, power outages, network failures, operating system failures, program failures, misconfigurations, and hardware deterioration.

As should be appreciated, the various methods, devices, components, etc., described with respect to FIG. 1 are not intended to limit systems 100 to being performed by the particular components described. Accordingly, additional topology configurations may be used to practice the methods and systems herein and/or components described may be excluded without departing from the methods and systems disclosed herein.

Figure 2:
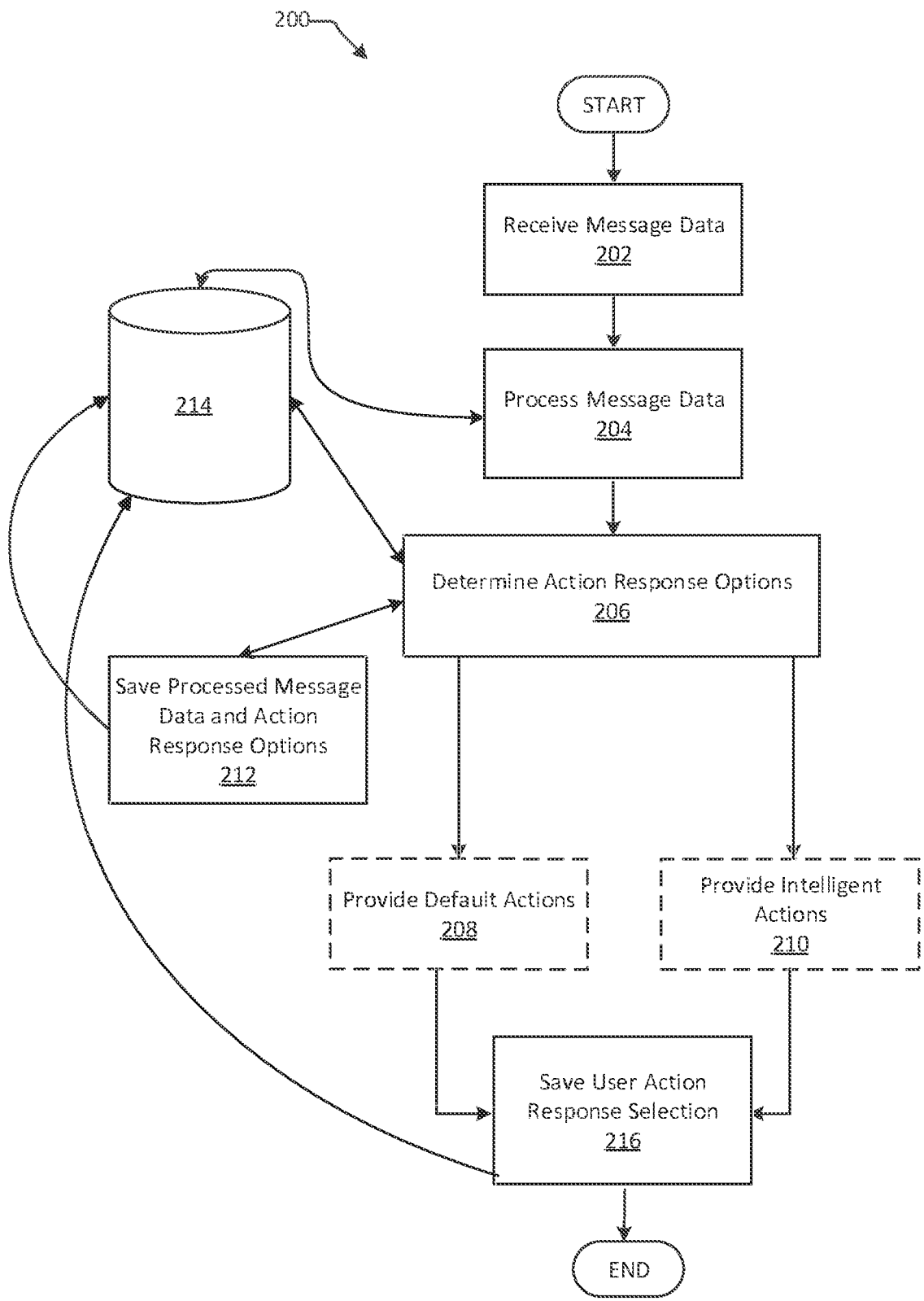
FIG. 2 is a block diagram illustrating a method for providing intelligent action responses according to processed message data.

FIG. 2 is a block diagram illustrating a method for providing intelligent action responses according to processed message data.

System 200 begins with receive message data operation 202. The message data may include, but is not limited to, the identity of the sender, the time of day, the GPS locations of the sender and the user, grammatical features, semantic features, and syntactical features. Additionally, the system 200 may be able to acquire information regarding the sender's device data and the user's device data, including operating environment characteristics, battery life, hardware specifications, local files, third-party applications, and other relevant information that may be used to provide a more enjoyable and robust user experience with the action response system. Other message data that mat be received at operation 202 may include, but is not limited to, historical conversation data between the sender and the user. For example, in an electronic email message, system 200 may not only acquire data associated with the most recently transmitted message from the sender, but also the previous chain of sent and received electronic messages between the sender and the user. Such comprehensive message data may allow the action response system to provide more accurate and personalized suggested actions based on both the processed message data and previously stored message data.

Additionally, system 200 may be able to receive message data in a variety of mediums, including, but not limited to, textual input, voice input, stylus input, and other input mechanisms. System 200 may receive non-textual input and convert that input to text for processing through a natural language processor. Furthermore, system 200 may be able to receive and process message data among a variety of different languages and language types (e.g., right-to-left and left-to-right written languages). System 200 may receive all of or a portion of the aforementioned information related to message data at receive message data operation 202.

At process message data operation 204, system 200 may utilize a natural language processor to identify the most relevant portions of the message data. For example, a sentence ending in a question mark may be identified as a more pertinent part of the message data and processed accordingly. In other example aspects, a question mark may cause that sentence to receive a higher priority ranking during the process message data operation 204. A portion of the message data (e.g., a sentence) with a higher priority ranking may be highlighted first for the user and have associated intelligent action responses before other portions of the message data are highlighted and populated with possible intelligent action responses.

Additionally, process message data operation 204 may include comparing the received message data from operation 202 with previously stored message data located in database 214. For example, as previously mentioned, a portion of the message data received in operation 202 may include the identity of the sender. During the process message data operation 204, the sender identity may be used to retrieve previously stored data related to that specific sender, such as past conversations between the user and the sender. Specifically, the historic data in database 214 may indicate that the user typically responds to the identified sender in a particular way. Thus, rather than displaying a broad intelligent action response to the user, the action response system may provide a more personalized and tailored response to the user.

Furthermore, during process message data operation 204, the received message data may be parsed into "tokens," which may be characterized as a sequence of characters. Tokens may be come in the form of a single character or punctuation mark (e.g., a question mark or exclamation point), a single key word, a phrase, a sentence, a paragraph, or a combination of the aforementioned forms. In order to parse the message data appropriately, the process message data operation 204 may compare certain features of the message data against a set of already-imported existing message data and/or historically saved message data to extract the most pertinent aspects of the message data input. For example, a set of existing data may contain a prioritized list of tokens that indicate a question phrase. A sender asking a question most likely wants to receive an answer to that question, so the question phrases may be marked as high priority phrases. System 200 may determine whether or not the message data contains any question phrases by comparing the message data input with the already-imported message data of frequently used question tokens, such as "do you" or "can you" or "what." If system 200 finds a match at process message data operation 204 between the already-imported message data from database 214 and the message data input, then that word, phrase, sentence, etc. may eventually be highlighted for the user with a set of at least one action responses attached. The process message data operation 204 is further described in detail in FIG. 3.

After the message data is processed at operation 204, system 200 then determines the appropriate action responses to associate with the message data that may eventually be displayed to the user. During the determine action response options operation 206, the results from the processed message data may be analyzed to determine which action response options are most appropriate. To make this determination, system 200 may compare an already-existing set of data from database 214 that may contain a matrix of various message data tokens and corresponding action response options. For example, a message data token that was identified during the process message data operation 204 may have been a question mark. A preloaded matrix of message data tokens and associated action response options may indicate that a question mark token corresponds to the action response options of "yes" or "no." However, further analysis of the processed message data may indicate that the highlighted question from the message data may not be a yes/no-type question due to other message data tokens, such as tokens associated with question words that do not elicit a yes/no answer, such as "how," "who," "what," etc. In the instances where a highlighted question is not a yes/no question, the determine action response options operation 206 may analyze previous action responses that were selected with similar message data tokens. For example, a message data token may be associated with the phrase "how are you." Another token may be associated with a question mark. Although the question mark token alone may trigger a "yes" or "no" action response, the combination of the question mark token and the "how are you" token may trigger a more specific action response, such as "I'm well" or "I'm OK, how are you?" Not only may boilerplate, preexisting sets of data be utilized in determining the appropriate action responses to present to the user, but also historical message data associated specifically with past action responses of the user may be utilized in determining the most appropriate and personalized intelligent action responses to present to the user.

After the appropriate action responses are determined at operation 206, the processed message data and the set of determined action responses may be saved at operation 212 and stored in database 214. Specifically, the various tokens that are associated with the message data input, the features that were extracted from the message data, the domain classifiers that were attached to the message data, the semantic determinations, and the set of possible action responses may all be saved at operation 212 so that future intelligent action responses may become more accurate and personalized. As a result of this constant input of data, the machine-learning algorithms that determine the appropriate action responses become smarter and more personalized to the user, ultimately saving more time for the user and conserving valuable technological resources.

Additionally, after the determine action response options operation 206, system 200 then determines whether to provide default action responses at operation 208 or provide intelligent action responses at operation 210. In some instances, a combination of both default action responses and intelligent action responses may be provided to the user. The default action responses may include, but are not limited to, "Quote" and "Highlight." For example, "Quote" may refer to the action response of copying a certain sentence or phrase from the received message into a reply box, and upon using the "Quote" action response, a generic reply may automatically be suggested. Specifically, consider an example where the sentence was "Can you please merge my two code base accounts?" If this sentence was highlighted manually by the user, then the user may have the default action response of "Quote." By selecting "Quote," the generic suggested replies may include "yes" or "no." However, in some example aspects the action response system 200 may automatically highlight that sentence and provide more appropriate and intelligent replies, such as "done!" or "No problem." Specifically, if the user frequently receives requests to merge code base accounts, system 200 may have historical data in database 214 that may be analyzed before determining exactly which intelligent action responses to provide to the user. If the user has frequently responded with "done!" in the past to questions regarding merging code base accounts, then the action response system may provide "done!" as the most appropriate and intelligent action response.

In some example aspects, if system 200 is unable to determine which intelligent action responses to provide to a user, the system 200 may resort to providing default action responses in operation 208. Alternatively, if system 200 is able to determine at least one intelligent action to provide to the user based on the processed message data and the historical data from database 214, then system 200 may provide intelligent action responses at operation 210.

After the action responses are presented to the user, if the user selects a suggest action response, that selection may be saved at operation 216 and used in determining future intelligent action responses. In other example aspects, if a user declines to select a suggested action response (regardless if the action response is a default action response from operation 208 or an intelligent action response from operation 210), the user may respond to the message data by creating a manual reply or taking a manual action. This manual reply or action may be captured and stored in database 214 and utilized to construct future intelligent action responses specifically for the user. The previously processed message data from operation 204 may be compared with the manual input or action from the user that was saved at operation 216. The machine-learning algorithms powering the action response system may be able to generate new relationships among certain message data tokens, features, classifications, as well as manual inputs and actions. This relationship data may be leveraged in future intelligent action responses, as the machine-learning algorithms may become smarter and more personalized.

System 200 may be initiated manually or automatically. In some example aspects, a user may select the portion of the message data to be analyzed by the action response system. In other example aspects, the action response system itself may automatically highlight certain portions of the message data and provide automatic action responses. In some other example aspects, the action response system may analyze the message data and process the message data. However, at determine action response options operation 206, system 200 may conclude that no viable action response systems currently exist. As a result, no portion of the message data may be automatically highlighted for the user. However, even after the action response system reaches such a conclusion, a user may still elect to highlight a portion of the message data and initiate the action response system 200. Because the action response system 200 had already analyzed the message data in this instance, the system 200 may immediately jump to operation 208 and present the default action responses to the user. If the user selects one of the default action responses, that selection may be saved at save user action response selection operation 216 and utilized in future intelligent action response analyses. If the user declines to select one of the default action responses and enters a manual reply or takes a manual action, that reply or action may also be stored at operation 216 and further utilized in future intelligent action response analyses.

Lastly, the action response system 200 may be implemented on a variety of electronic devices including, but not limited to, a personal computer, a laptop computer, a mobile device, and a tablet. As discussed previously, system 200 may be run on a distributed system, comparing historical message and action response data across multiple devices and servers in order to provide the most accurate and intelligent set of action responses to the user.

As should be appreciated, the various methods, devices, components, etc., described with respect to FIG. 2 are not intended to limit systems 200 to being performed by the particular components described. Accordingly, additional topology configurations may be used to practice the methods and systems herein and/or components described may be excluded without departing from the methods and systems disclosed herein.

Figure 3:
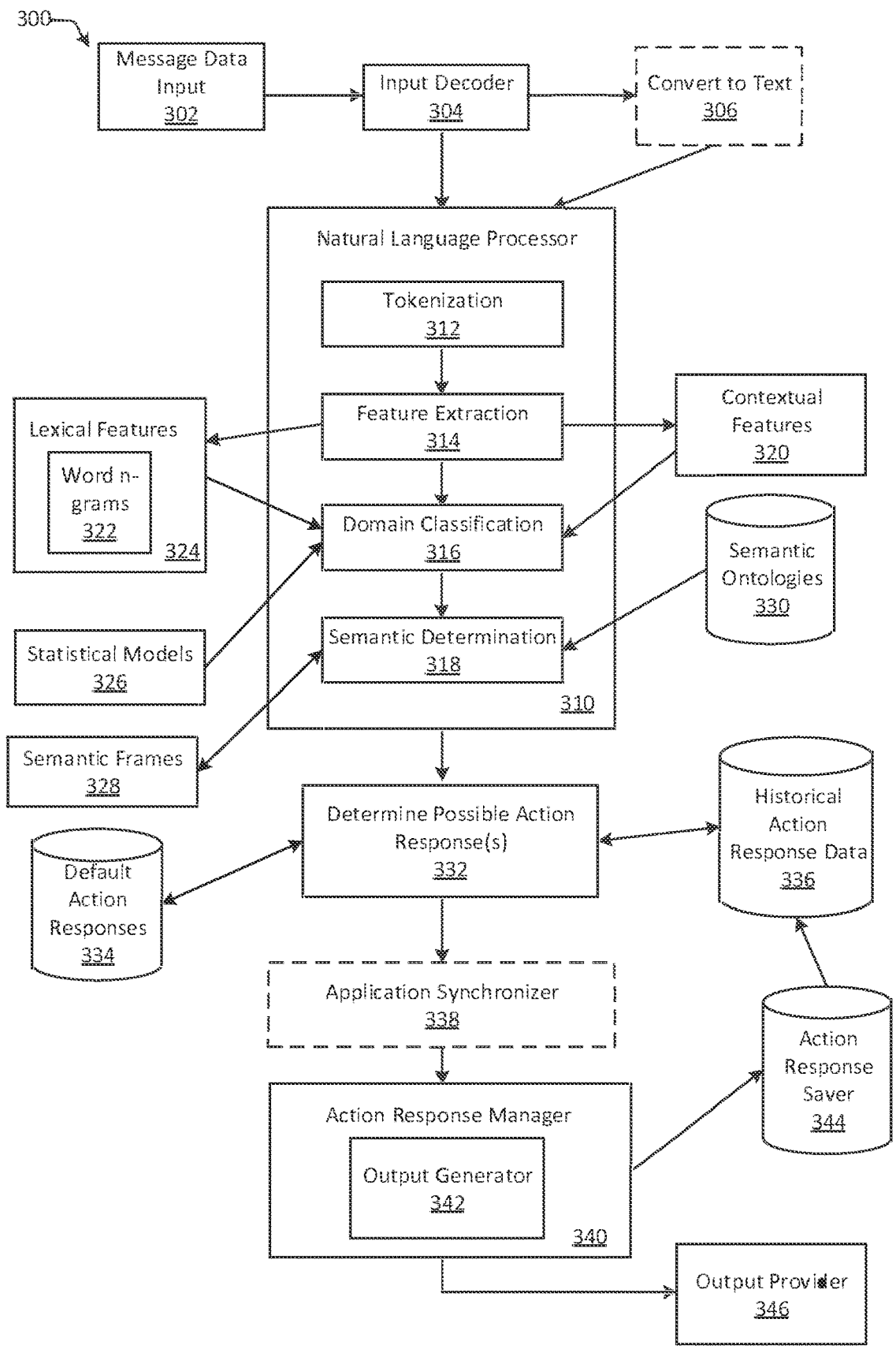
FIG. 3 is a block diagram illustrating a method for processing message data to determine possible action responses.

FIG. 3 is a block diagram illustrating a method for processing message data to determine possible action responses.

As previously described, message data input 302 may consist of textual input, speech input, handwritten/stylus input, and other various types of input. For example, a message input 302 may consist of an electronic message in an electronic mail application, a text messaging application, or a discussion forum, among others. In other example aspects, the message data input 302 may consist of a voice message that was transmitted, for example, through a text messaging application. In yet other example aspects, a video message may have been pre-recorded and sent through an electronic mail application or a video chat application, such as Skype®. Regardless of the medium of the message data input 302, an intelligent action response or responses may be generated. Once the input is received, the message data input 302 may be sent to the input decoder 304.

The input decoder 304 may determine if the input should be converted to text. If a message data input, such as a non-textual input like speech input and/or handwriting input, should be converted to text, the input decoder 304 may transmit the message data input 302 to the convert to text operation 306, where the input may be converted to text for processing by the natural language processor 310. For example, the message data input 302 may include a voicemail message. A voicemail message is a speech-based input and may need to be converted to text in order for processing through the natural language processor 310. A voicemail message may be received, and a user may desire to reply to that voicemail message through a messaging application. The action response system may convert the voicemail message to text at convert to text operation 306, thereby initiating the processing phase. Eventually, an action response may be provided to the user according to the processing of the voicemail message.

In some example aspects, the message data input 302 may not need to be converted to text because the message data input is already in textual form when it is received by system 300. As a result, the text-based message data may be transmitted from the input decoder 304 to the natural language processor 310 for processing. As previously mentioned, in other example aspects, the message data may be in non-text format and be transmitted to the convert to text operation 306. The convert to text operation 306 may convert the message data input to text and subsequently transmit the converted textual message data input to the natural language processor 310 for further processing.

Once the text-based message data input is sent to the natural language processor 310, the natural language processor 310 may parse the message data text and extract various semantic features and classifiers, among other operations. The message data may be converted into semantic representations that may be understood and processed by a machine utilizing machine-learning algorithms to intelligently disassemble the message data and provide the most accurate and appropriate action responses.

In some example aspects, the natural language processor 310 may begin with tokenization operation 312. The tokenization operation 312 may extract specific tokens from the message input data. As previously described, a "token" may be characterized as any sequence of characters. It may be a single character or punctuation mark, a phrase, a sentence, a paragraph, multiple paragraphs, or a combination of the aforementioned forms. During the tokenization operation 312, key words from the message data input 302 may be isolated and associated with general topics that may be preloaded into the natural language processor. These topics may be located in a preexisting matrix of data where certain tokens are associated with certain topics. For example, a message data input may include the following phrase: "Jim, do you want to play golf on Wednesday afternoon?" The tokenization operation 312 may first associate a token with the sender. That token may subsequently be associated with past conversations between the sender and the user, as well as processed message data and various action responses. The token phrase "do you" may be associated with a non-yes/no question entity. The token word "golf" may be associated with an activity entity. In some example aspects, if a user frequently plays golf, a specific golf entity may be established that is associated with any mention of "golf" or other derivative words and phrases (e.g., "tee," "course," "links," etc.). In yet further example aspects, the "golf" token may also be associated with GPS locations of frequently visited golf courses by the user. The token phrase "Wednesday afternoon" may be associated with a calendar event entity. After tokenization operation 312, some possible action responses that may be presented to the user include, but are not limited to, an action button to create a calendar event, a reply of "Absolutely!", an action button to a third-party golf application, an action button to a maps application displaying nearby golf courses, and a reply of "I'm sorry, but I'm busy that day."

After the message data input 302 is processed through the tokenization operation 312, the message data input may then be analyzed by the feature extraction component 314. The feature extraction component may extract lexical features 324 and contextual features 320 from the message data input 302 for use by the domain classification component 316. The lexical features 324 that may be analyzed in the feature extraction component 314 may include, but are not limited to, word n-grams 322. A word n-gram is a contiguous sequence of n words from a given sequence of text. As should be appreciated, analyzing word n-grams may allow for a deeper understanding of the message data input and therefore provide more accurate and intelligent action responses to the user. The machine-learning algorithms may be able to compare thousands of n-grams, lexical features, and contextual features in a matter of seconds to extract the relevant features of the message data. Such rapid comparisons are impossible to employ manually. The contextual features 320 that may be analyzed by the feature extraction component 314 may include, but are not limited to, a top context and an average context. A top context may be a context that is determined by comparing the topics and key words of the message data input with a set of preloaded contextual cues. An average context may be a context that is determined by comparing the topics and key words of historical processed message data, historical action responses, manual inputs, manual actions, public social media profiles, and other data. The feature extraction component 314 may also skip contextually insignificant message data when analyzing the textual input. For example, a token may be associated with articles, such as "a" and "an." However, because articles are typically insignificant in the English language, the feature extraction component 314 may ignore these article tokens.

After the feature extraction component 314 extracts the pertinent lexical features 324 and contextual features 320 of the message data input, the message data may be transmitted to the domain classification component 316. The domain classification component 316 analyzes the lexical features 324 and the contextual features 320 that were previously extracted. The domain classification component 316 analyzes the lexical features 324 and the contextual features 320 that were previously extracted from the feature extraction component 314. These lexical and contextual features may be grouped into specific classifiers for further analysis. The domain classification component 316 may also consider statistical models 326 when determining the proper domain that should be selected for the possible action responses. In some example aspects, the domain classification component 316 may be trained using a statistical model or policy (i.e., prior knowledge, historical datasets) with previous message data inputs. For example, as previously mentioned, the word "golf" may be associated with a specific activity token. Additionally, the word "golf" may be associated with a broader domain classification, such as a "sports" domain. Previous message data and associated action responses related to the "sports" domain may be analyzed at this step. Similarly, the word "golf" may be associated with a group domain. For example, if a user frequently plays golf with three other friends, any message data associated with those three friends may be analyzed at this step, as well.

After proper domain classifications are assigned to the message data input at operation 316, the message data input may then be sent to the semantic determination component 318. The semantic determination component converts the message data input into a domain-specific semantic representation based on the domain that was assigned to the message data by the domain classification component 316. The semantic determination component 318 may draw on specific sets of concepts and categories from a semantic ontologies database 330 to further narrow down the set of appropriate action responses to present to the user. For example, a user may receive an electronic message that says "Do you want to grab dinner with me Friday night?" The phrase "grab dinner with me Friday night" may indicate that the sender desires to know whether the user has availability on Friday night and to know whether the user wants to grab dinner with the sender on Friday night. The key words and phrases of "dinner" and "Friday night" may have previously been assigned domains by the domain classification component 316, and as a result, the semantic determination component 318 may then determine that the sender specifically desires to know whether the user has availability on Friday night according to the calendar data of the user and whether the user desires to have dinner with the sender according to previous conversational message data between the user and the sender, for example. Thus, system 300 may access the calendar data of the user, determine that the user already has an event scheduled for Friday night, and as a result, eliminates any action response option of "Yes" or "Absolutely" or "Count me in!" etc.

In other example aspects, the semantic determination component 318 may have predefined semantic frames 328 associated with third-party applications. For example, a sender may transmit a voice message that says, "Do you want to see the Star Wars movie with me tonight?" The semantic determination component 318 may determine that the sender intends to see a movie with the user. Search information that may be predefined by the semantic frames 328 may include, but is not limited to, directors, actors, genres, release dates, show times, and ratings. Specifically, if the Star Wars movie had not yet been released, some appropriate intelligent action responses may be, "I'd love to, but that movie isn't out yet!" or "I thought Star Wars doesn't come out until next Friday."

After the natural language processor 310 has completed its analysis of the message data input, the message data input may be transmitted to the determine possible action response operation 332. By funneling the message data input through the natural language processor 310, many of the initial action responses may have been filtered out. Thus, determine possible action responses operation 332 may be characterized as the final filter in determining which action responses to display to the user and which order those action responses may be displayed to the user. The determine possible action responses operation 332 may utilize a priority algorithm that considers not only the processed message data input from the natural language processor 310, but also historical action response data from database 336, as well as default action responses from database 334. For example, a user may receive the following message: "Can we go hiking this weekend?" After this message is processed through the natural language processor 310, the determine possible action response operation 332 may determine a priority ranking of the various intelligent action responses to display to the user. Data from the default action responses database 334 may provide action responses such as "Yes, I'd love to!" or "No, let's do something else." More specific and intelligent action responses may be received and evaluated from the historical action response database 336. For example, the aggregation of historical message data and the public social profile of the user may indicate that the user enjoys hiking. However, more recent message data and perhaps, public social profile data, specifically associated with the user's significant other may indicate that the user's significant other had recently undergone knee surgery. Normally, the determine possible action response operation 332 may prioritize the action response "Yes, I'd love to!" at the top of the action response list. However, due to the newest data regarding the user's significant other, the determine possible action response operation 332 may prioritize the response "I'd love to, but are you really feeling well enough for that?" at the top and display such an action response and similar responses first to the user.

In some example aspects, after the message data input is analyzed by the natural language processor 310 and the determine possible action response operation 332, a possible intelligent action response may involve a third-party application. If a possible action response implicates a third-party application, the application synchronizer 338 may be employed. the application synchronizer 338 may connect the possible action responses with third-party applications. For example, consider the previous illustration, "Do you want to see the Star Wars movie with me tonight?" In the instance that the Star Wars movie had already been released in theatres and the user had no calendar event conflicts, the most intelligent action response to display to the user may be an action button that would redirect the user to a third-party application with show times for the Star Wars movie. In further example aspects, the system may aggregate nearby theatre show times and incorporate those show times into the possible action responses. For example, an intelligent action response that may be displayed to the user may be, "Yes, how about the 9:10 pm show at the Pavilions UA theatre?" By automatically pulling specific show time and theatre location data and integrating this data into the displayed action responses, the action response system eliminates the need for a user to navigate among other applications to locate this show time and theatre location data and manually input the data into a subsequent message. Not only does this save significant amounts of time and eliminate potential transmission errors (e.g., looking up a show time, but mistyping the show time or theatre location), but it also conserves significant amounts of battery life for the user's device, since the user may not need to navigate between multiple applications. Furthermore, the number of query requests that the user may need to send and receive will also decrease, since the system intelligently collects the pertinent information from third-party applications without sending or receiving additional queries over a network, which a user may carry out if the information was collected manually.

After the possible action responses are determined at operation 332 and the action responses are potentially synchronized with third-party applications at operation 338, the action response manager 340 prepares the action responses for display to the user. The action response manager 340 may also be responsible for saving the determined action responses for subsequent data analysis in further intelligent action response processes. The action response manager 340 may store the determined action responses in the action response saver 344. The saver 344 may be located locally on the device of the user, remotely (e.g., server or distributed cloud environment), or on a combination of both local and remote storage locations.

After any additional data has been gathered and the action responses have been prepared for output by the action response manager 340, the output generator 342 generates a set of at least one action response (which may be a default action response or a personalized, intelligent action response, or a combination of the two) to be displayed to the user. The output provider 346 provides the set of action responses on the screen of a device to the user. In some example aspects, the display of the action response(s) may be a pop-up hovering over the pertinent portion of the message. In other example aspects, the display of the action response(s) may be populated as a list in a reply textbox. In yet further example aspects, the display of the action response(s) may be presented in a side bar on the side of a device screen or in a banner at the top or bottom portions of a device screen. Additionally, multiple displays of action responses may occur simultaneously. For example, one portion of a message may have a set of action responses hovering over it in the form of a pop-up, while another portion of a message may have a set of action responses hovering over it in the form of a pop-up. Once the action responses are presented on the screen within the application or webpage, the displayed action responses may remain even if the user navigates away from the application or webpage. For example, in an electronic mail application, if a user activates the action response system for one message, but then decides to navigate to another message, the user may then return to the previous message and see the displayed action responses. In further example aspects, a user may navigate to another message or application, activate the action response system on the other message or application, select an appropriate action response, and subsequently return to the previous message and still see the displayed action responses.

As should be appreciated, the various methods, devices, components, etc., described with respect to FIG. 3 are not intended to limit system 300 to being performed by the particular components described. Accordingly, additional topology configurations may be used to practice the methods and systems herein and/or components described may be excluded without departing from the methods and systems disclosed herein.

Figure 4A:
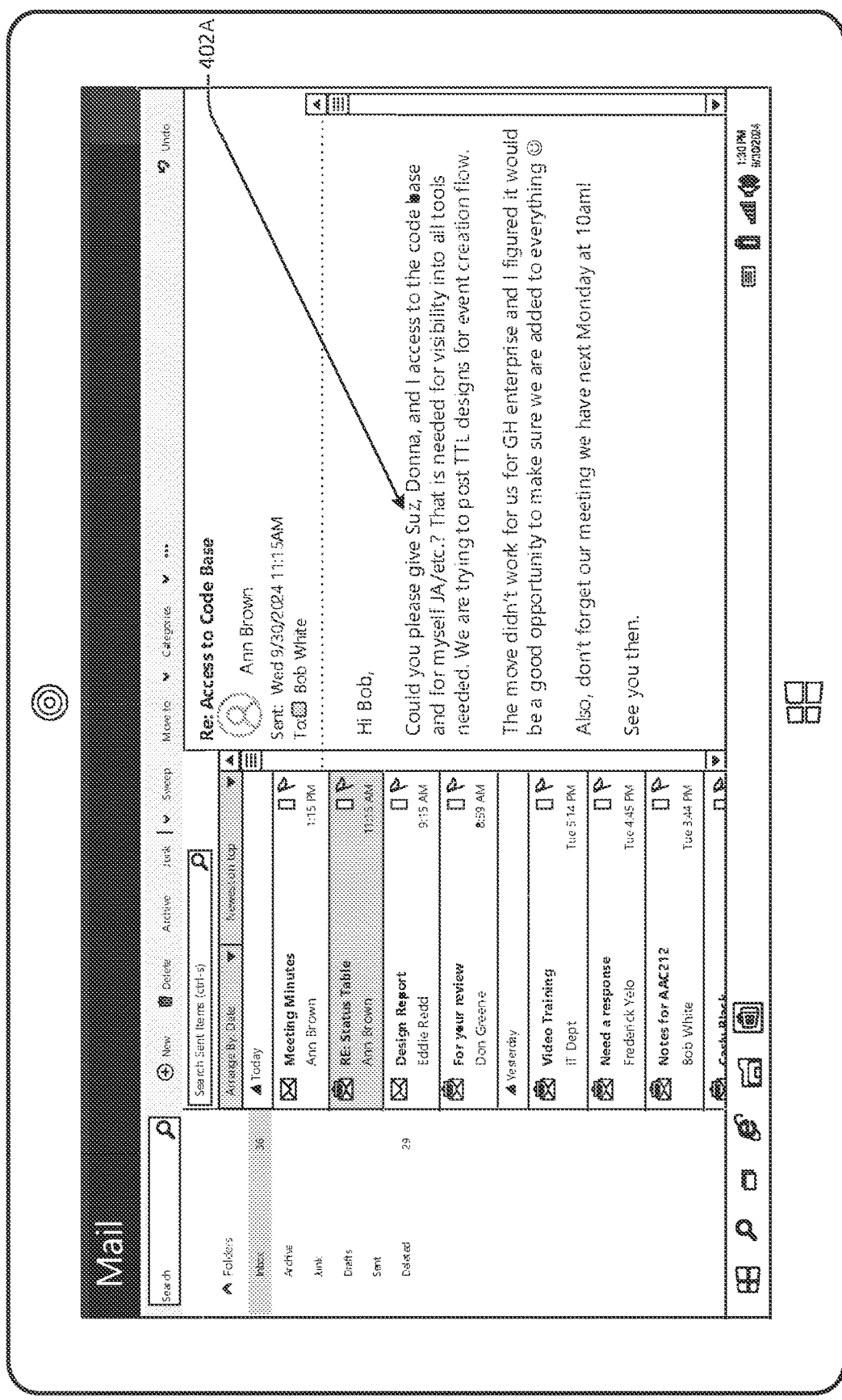
FIG. 4A illustrates an example of an electronic mail application before intelligent highlights are applied.

FIG. 4A illustrates an example of an electronic mail application before intelligent highlights are applied. As depicted, a personal computer 401A is displaying an electronic mail application without any intelligent highlights. A user may elect to activate an action response system on the portion of the message designated by area 402A. As previously mentioned, a user may manually highlight a portion of text using external hardware, such as a keyboard and mouse, and activate the action response system. Alternatively, if the action response system is configured to activate automatically within certain applications or perhaps, within any message-based activity on personal computer 401A, the action response system may automatically highlight the portion of text designated by portion 402A and provide a set of action responses to the user. As should be appreciated, the action response system may identify the message data initially without outwardly highlighting the text. The action response system may process the message data and determine a set of appropriate action responses to display to the user initially. Following the processing of the message data and determination of the action responses, the relevant portions of the message may be highlighted for the user with the associated action responses displayed.

Figure 4B:
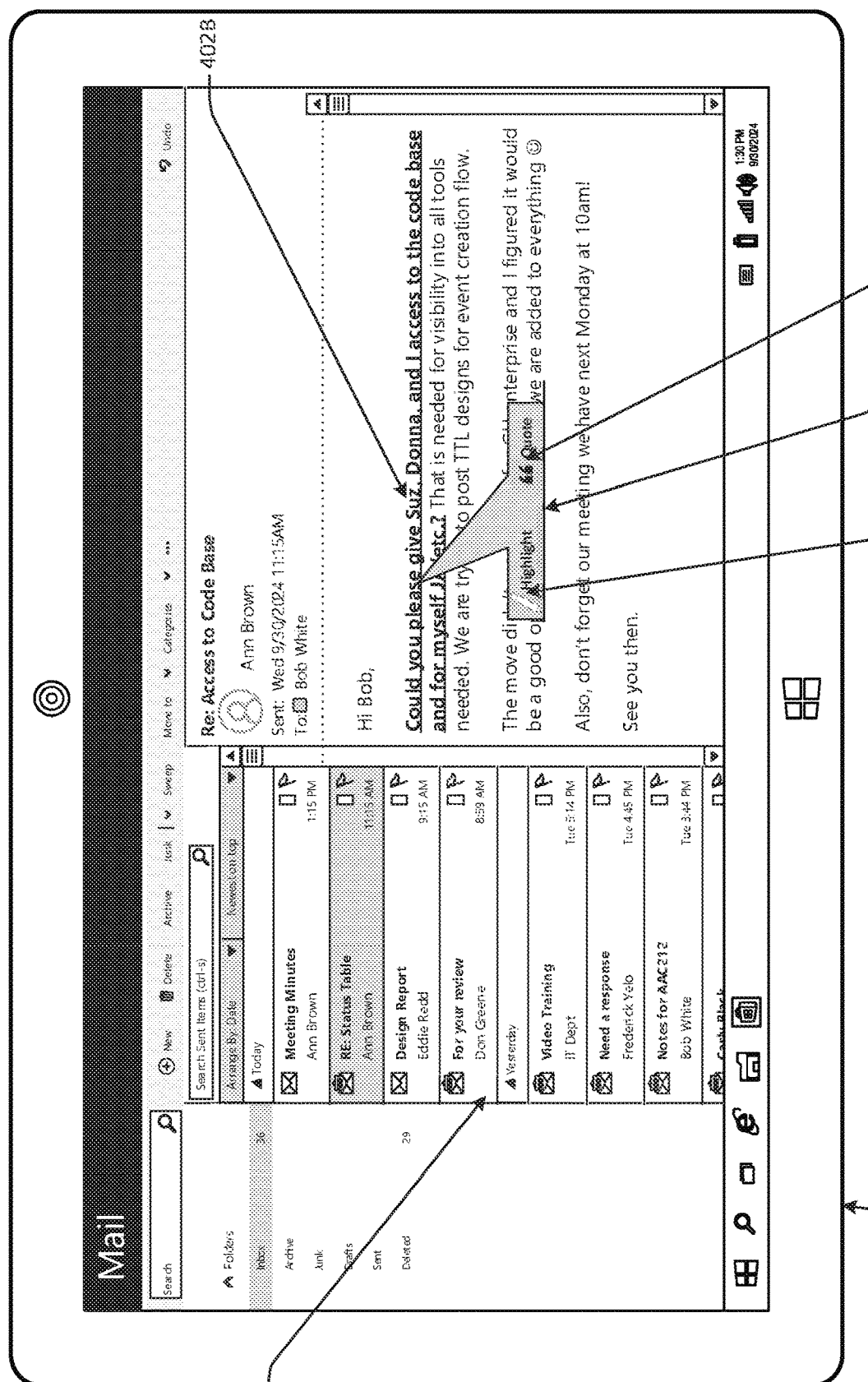
FIG. 4B illustrates an example of an electronic mail application after intelligent highlights are applied and possible intelligent action responses are displayed.

FIG. 4B illustrates an example of an electronic mail application after intelligent highlights are applied and possible intelligent action responses are displayed. As depicted, personal computer 401B illustrates an electronic mail application with a portion of the message highlighted as designated by portion 402B. Portion 402B contains several phrases that may be tokenized as described in FIG. 3. For example, the phrase "can you" coupled with the punctuation mark "?" may indicate a yes/no question sentence. As previously mentioned, portions of message data with such characteristics may be prioritized above other non-interrogatory sentences. As a result, portion 402B may be automatically highlighted by the action response system, and subsequent action responses may be displayed.

As depicted, a pop-up action response box 404B contains two different action responses: Quote action response 406B and Highlight action response 408B. Quote action response 406B may consist of the action response system copying the portion of the message indicated by portion 402B into a reply dialogue box and subsequently displaying an intelligent reply. The Highlight action response 408B may consist of providing feedback to the action response system about the portion of message data designated by portion 402B. The Highlight action response 408B may also allow a user to re-transmit the selected message portion 402B through the action response system to ascertain whether or not other intelligent action responses may be provided.

In other example aspects, the pop-up action response box 404B may appear in a summary pane within the electronic mail application. For example, the pop-up action response box 404B may appear at position 414B in the list view area of the electronic mail application. This may allow a user to select an intelligent action response or a default action response without actually opening the e-mail message. The action response system may analyze message data of previous e-mail messages or unopened e-mail messages and provide suggested action responses to the user. The suggested action responses, such as the action responses 406B and 408B located within action response box 404B, are not limited to the most recent message, but may be applied across previous messages, as well as messages that have yet to be opened or read by the user.

Figure 4C:
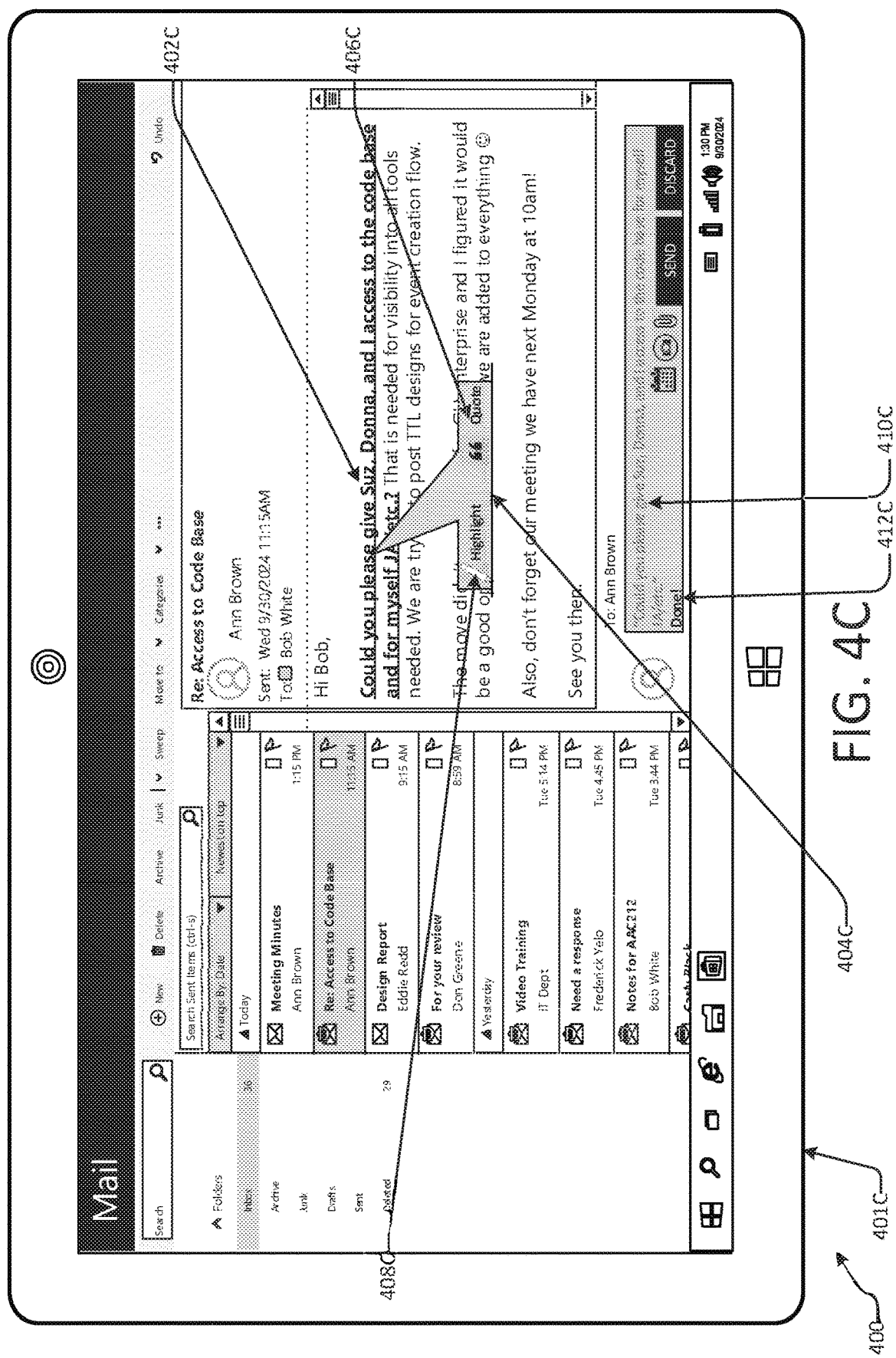
FIG. 4C illustrates an example of an electronic mail application after an intelligent response is selected.

FIG. 4C illustrates an example of an electronic mail application after an intelligent response is selected. As depicted, personal computer 401C illustrates an electronic mail application after an action response has been applied based on the message portion 402C. Here, the user has elected to select the Quote action response 406C. The highlighted message portion 402C may then be copied to the area 410C within the reply dialogue box. Additionally, the action response system may automatically generate an intelligent response 412C. For example, a user who frequently receives requests from senders to access a certain code base may frequently reply to these requests with "Done!" The action response system may capture this data, and the machine-learning algorithms determining which action responses to display to the user may learn from these frequent replies to subject matter regarding access to code bases. As a result, the action response system may automatically provide an intelligent reply 412C that the user may then elect to transmit back to the senders.

As should be appreciated, the various methods, devices, components, etc., described with respect to FIGS. 4A, 4B, and 4C are not intended to limit system 400 to being performed by the particular components described. Accordingly, additional topology configurations may be used to practice the methods and systems herein and/or components described may be excluded without departing from the methods and systems disclosed herein.

Figure 5:
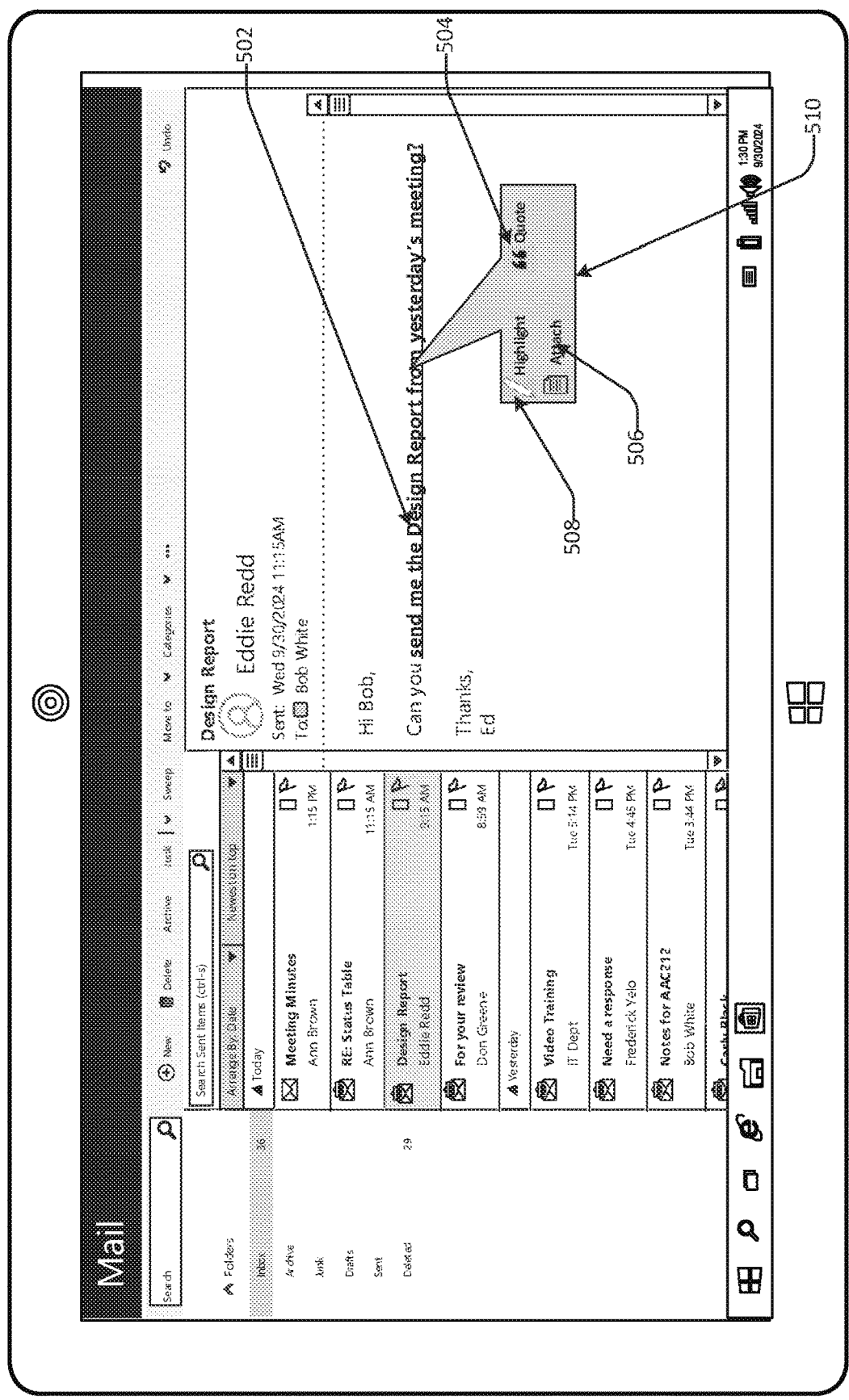
FIG. 5 illustrates an example of an electronic mail application with possible intelligent action responses related to document attachments.

FIG. 5 illustrates an example of an electronic mail application with possible intelligent action responses related to document attachments. As depicted, personal computer 501 is running an electronic mail application with intelligent highlights and intelligent action responses applied. The highlighted message portion is designated by 502. Here, the tokens from message portion 502 include "send," "Design Report," and "yesterday's meeting." Each of these tokens may all be analyzed through the action response system. Specifically, the token word "send" may indicate that the sender desires an attachment of some kind. The phrase "Design Report" indicates a specific type of document, and the phrase "yesterday's meeting" implicates a calendar event that may be pulled from the user's calendar data. Aggregating the features that are associated with this message may prompt the action response system to first refer to the user's calendar data and determine which meeting from yesterday the sender may be referencing. The action response system may search the various meetings in the user's calendar data to find the meeting where both the user and Eddie Redd were participants. As a result, the action response system may then use the start and end time of that meeting to extract a dataset of local documents that were opened on a device belonging to a user between those two times. The metadata of certain documents may be searched to find the relevant open-file and close-file timestamps. From this list of matching documents, the action response system may search through the document names, specifically searching for a document name that reflects the phrase "Design Report." Upon a successful match, the action response system may associate that specific document with the attach action button 506 that is displayed as one of the three possible action responses, along with the Quote action response 504 and the Highlight action response 508, within the action response box 510. A user may then select attach action button 506, which may then automatically attach the requested Design Report document referenced in the message data according to message portion 502.

As should be appreciated, the various methods, devices, components, etc., described with respect to FIG. 5 are not intended to limit system 500 to being performed by the particular components described. Accordingly, additional topology configurations may be used to practice the methods and systems herein and/or components described may be excluded without departing from the methods and systems disclosed herein.

Figure 6:
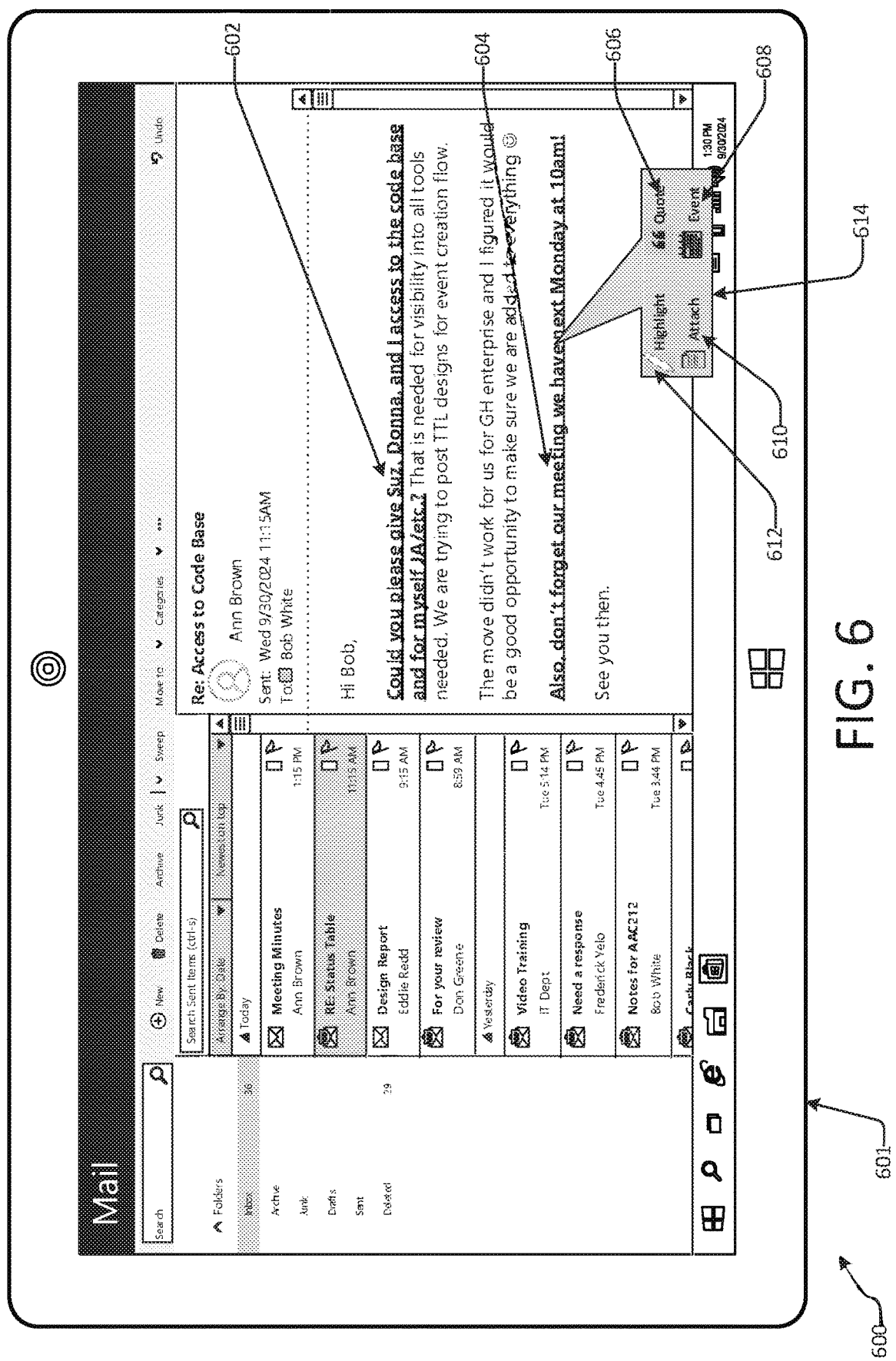
FIG. 6 illustrates an example of an electronic mail application with multiple intelligent highlights and possible intelligent action responses.

FIG. 6 illustrates an example of an electronic mail application with multiple intelligent highlights and possible intelligent action responses. As depicted, personal computer 601 is running an electronic mail application with multiple intelligent highlights and intelligent action responses applied. The action response system may display multiple suggested action responses through multiple highlighted sentences, phrases, words, paragraphs, etc. For example, both message portion 602 and message portion 604 may be highlighted simultaneously. As illustrated, message portion 604 is selected and currently displaying action response box 614 with a Quote option 606, an Event action response button 608, an Attach action response button 610, and a Highlight action response button 612. In other example aspects, multiple highlighted portions may be selected and multiple action response boxes may be displayed on the screen. In this example aspect illustrated in FIG. 6, the Event action response button 608 may be included within the action response box 614 due to the results of processing the highlighted message portion 604. The results of processing highlighted portion 604 may show that the tokens "our meeting," "Monday at 10 am," and "don't forget," are associated with a calendar entity. As a result, the action response system may prepare a calendar event for the user according to the tokens of message portion 604. If the user desires to add a calendar event (e.g., Meeting at 10 am next Monday), the user may select Event action response button 608 from the action response box 614. The action response system may synchronize with the calendar application associated with the user and add a calendar event. In other example aspects, the Event action response button 608 may navigate the user to the calendar application, prompting the user for further input and details.

In yet other example aspects, the user may first select event action response button 608 and create a new calendar event according to the details of message portion 604. The user may then subsequently select the Quote action response button 606, prompting the action response system to provide a suggested reply (e.g., "See you at the meeting Monday!"). In other example aspects, after a user may select the Event action response button 608 and create a new event for the meeting, the user may then select the Attach action response button 610 and attach the newly created Event to a subsequent reply.

As should be appreciated, the various methods, devices, components, etc., described with respect to FIG. 6 are not intended to limit system 600 to being performed by the particular components described. Accordingly, additional topology configurations may be used to practice the methods and systems herein and/or components described may be excluded without departing from the methods and systems disclosed herein.

Figure 7:
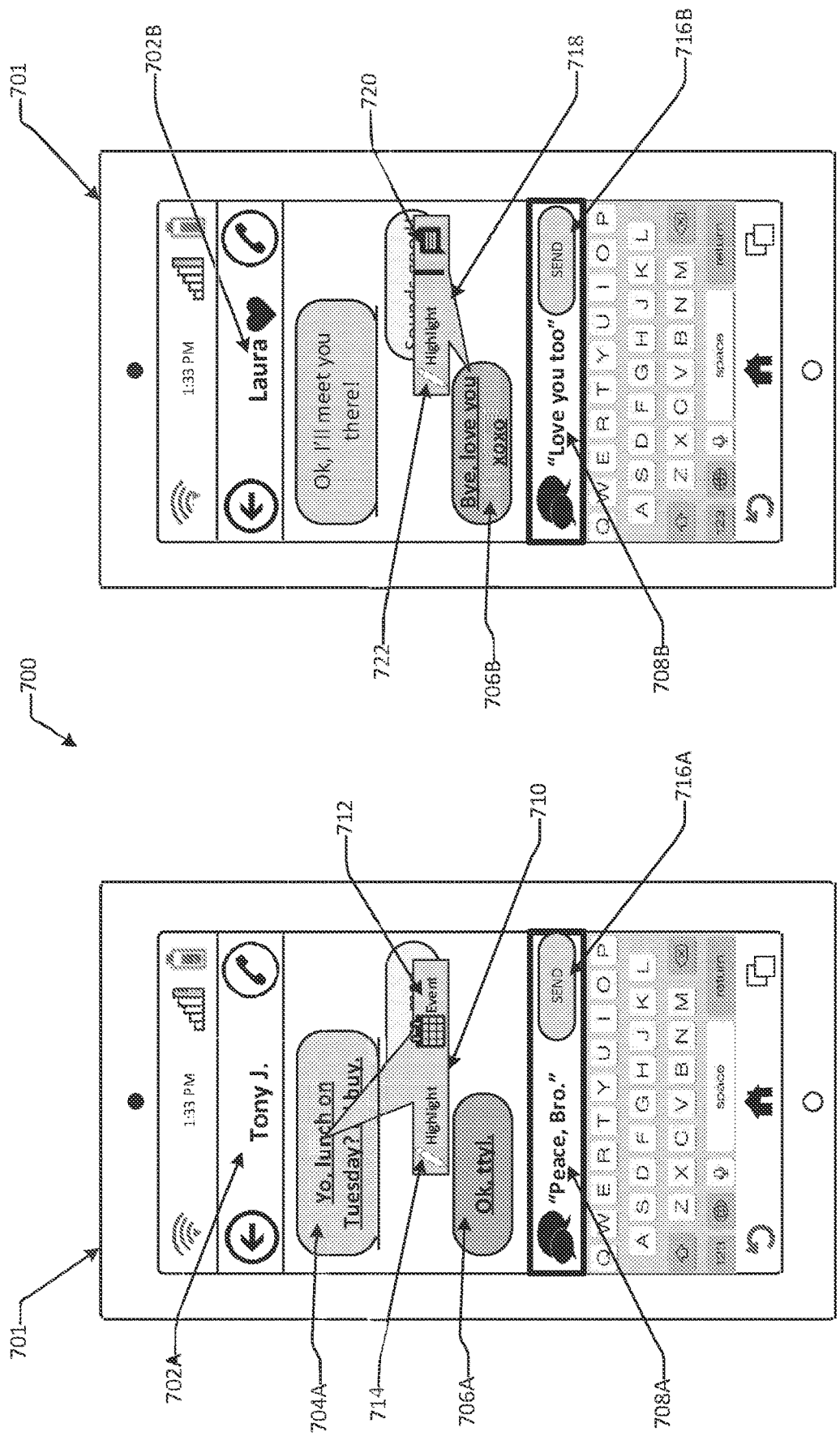
FIG. 7A illustrates an example of a mobile text messaging application with possible intelligent action responses.
FIG. 7B illustrates an example of a mobile text messaging application with possible intelligent action responses.

FIG. 7A illustrates an example of a mobile text messaging application with possible intelligent action responses. Mobile Device 701 is running a text messaging application. As illustrated, the contact area 702A indicates that Tony J. is the sender. In message 704A, Tony J. inquires about having lunch with the user on Tuesday. This message may be processed by the action response system. The processing results, as described in more detail in FIG. 3, may produce a variety of suggest action responses. As depicted inside the action response box 720, Highlight action response 714 and event action response 712 are the provided action responses. Some possible tokens that may have been extracted from message 704A include "lunch," Tuesday," and "?". According to these tokens, the action response system may conclude that a suggested Event creation action response (event action response 712) may be the most intelligent and appropriate response to the message. As mentioned previously, the action response system may be executed on any messaging application, including, but not limited to, electronic mail applications, text messaging applications, instant messaging applications, discussion forums, and other messaging applications.

Additionally, message 706A indicates a Goodbye message from Tony J. Based on prior conversational history between the sender (Tony J.) and the user and the possible other historical data (e.g., social media profiles, etc.) related to the sender and the user, the most appropriate suggest reply from the action response system may be message 708A— "Peace, Bro." For example, if Tony J. and the user are very close friends, their prior conversation history may indicate that Tony J. often ends a conversation with the phrase "ttyl," whereas the user may often end the conversation with "Peace, Bro." As described in more detail in FIG. 3, the type and substance of the reply message 708A may be dependent on preset classifiers, in addition to personally tailored conversational history between the sender and the user. Other dependent information may include aggregated data among many senders and users of the intelligent response system. If the user is content with the suggested reply 708A, the user may select the send button 716A and forgo typing a reply. As a result, time is conserved, battery life is saved, and the hardware is preserved, among several other technological benefits.

FIG. 7B illustrates an example of a mobile text messaging application with possible intelligent action responses. In this example, the contact area 702B indicates that the sender is Laura. For example, Laura may be the significant other of the user. The user may want to respond to Laura's last message 706B. After highlighting message 706B and therefore prompting the action response system to provide suggestions, an action response box 718 may appear with a highlight action response 722 and a reply message icon 720. As previously described, the highlight action response 722 may prompt the action response system to generate more action responses than the ones displayed. It may also hide/show the action response box 718 and apply/remove the highlighted aspect of the text. The reply message icon 720 may generate a suggested reply in the message box. As illustrated, a reply message 708B has been generated— "Love you too." Before the action response system may display message 708B, it may process message 706B and determine the appropriate action responses, including the most intelligent replies. For example, Laura is the user's significant other, and therefore, instead of saying "Peace, Bro" (message 708A to Tony J.), the action response system may suggest a more appropriate and intelligent response of "Love you too." If the user is content with the suggested message 708B, the user may elect to send the message by pressing send button 716B. As a result, the user may not need to type out a reply message, thereby saving time and battery life, as well as preserving the hardware of the mobile device 701. The action response system may analyze the highlighted message portions holistically, considering not only preset classifiers and tokens, but also historical conversational data between the sender and the user, as well as other external data, such as social media profiles, GPS location data, and other information the action response system may collect.

As should be appreciated, the various methods, devices, components, etc., described with respect to FIGS. 7A and 7B are not intended to limit system 700 to being performed by the particular components described. Accordingly, additional topology configurations may be used to practice the methods and systems herein and/or components described may be excluded without departing from the methods and systems disclosed herein.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, as described herein.

Figure 8:
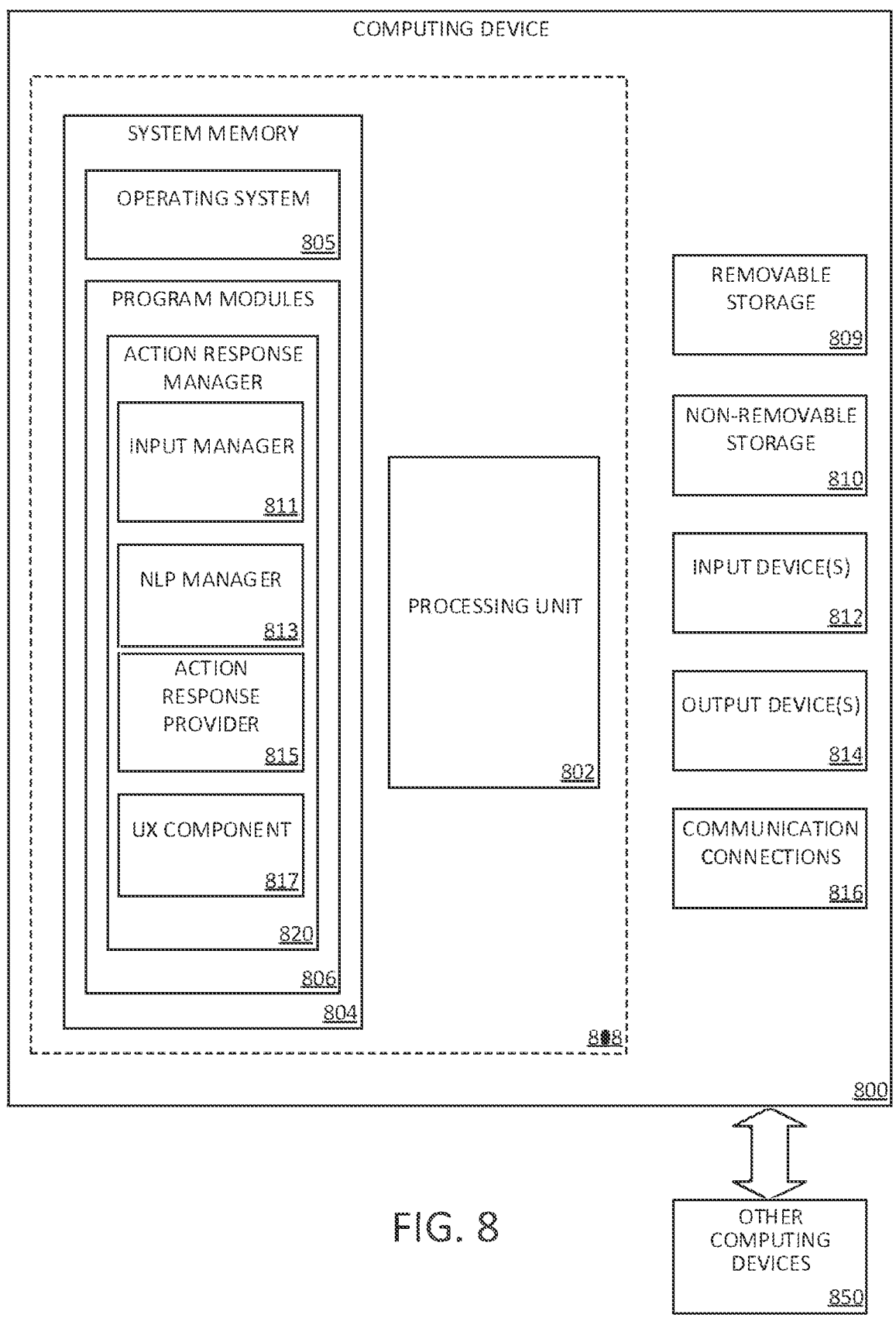
FIG. 8 is a block diagram illustrating example physical components of a computing device with which aspects of the disclosure may be practiced.

FIG. 8 is a block diagram illustrating example physical components (e.g., hardware) of a computing device 800 with which aspects of the disclosure may be practiced. The computing device components described below may have computer-executable instructions for implementing an action response manager 820 on a computing device (e.g., server computing device and/or client computing device). The computer-executable instructions for an action response manager 820 can be executed to implement the methods disclosed herein, including a method of automatically processing a message input and providing at least one intelligent action response according to the processing results. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read only memory), flash memory, or any combination of such memories. The system memory 804 may include an operating system 805 and one or more program modules 806 suitable for running an action response manager 820, such as one or more components with regard to FIGS. 1, 2, and 3, and, in particular, an input manager 811, a Natural Language Processor (NLP) manager 813, an action response provider 815, and/or UX Component 817.

The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., action response manager 820) may perform processes including, but not limited to, the aspects, as described herein. Other program modules that may be used in accordance with aspects of the present disclosure, and in particular for automatically processing a message input and providing at least one intelligent action response according to the processing results, may include an input manager 811, an NLP manager 813, an action response provider 815, and/or UX Component 817, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include tangible storage media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such tangible computer storage media may be part of the computing device 800. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
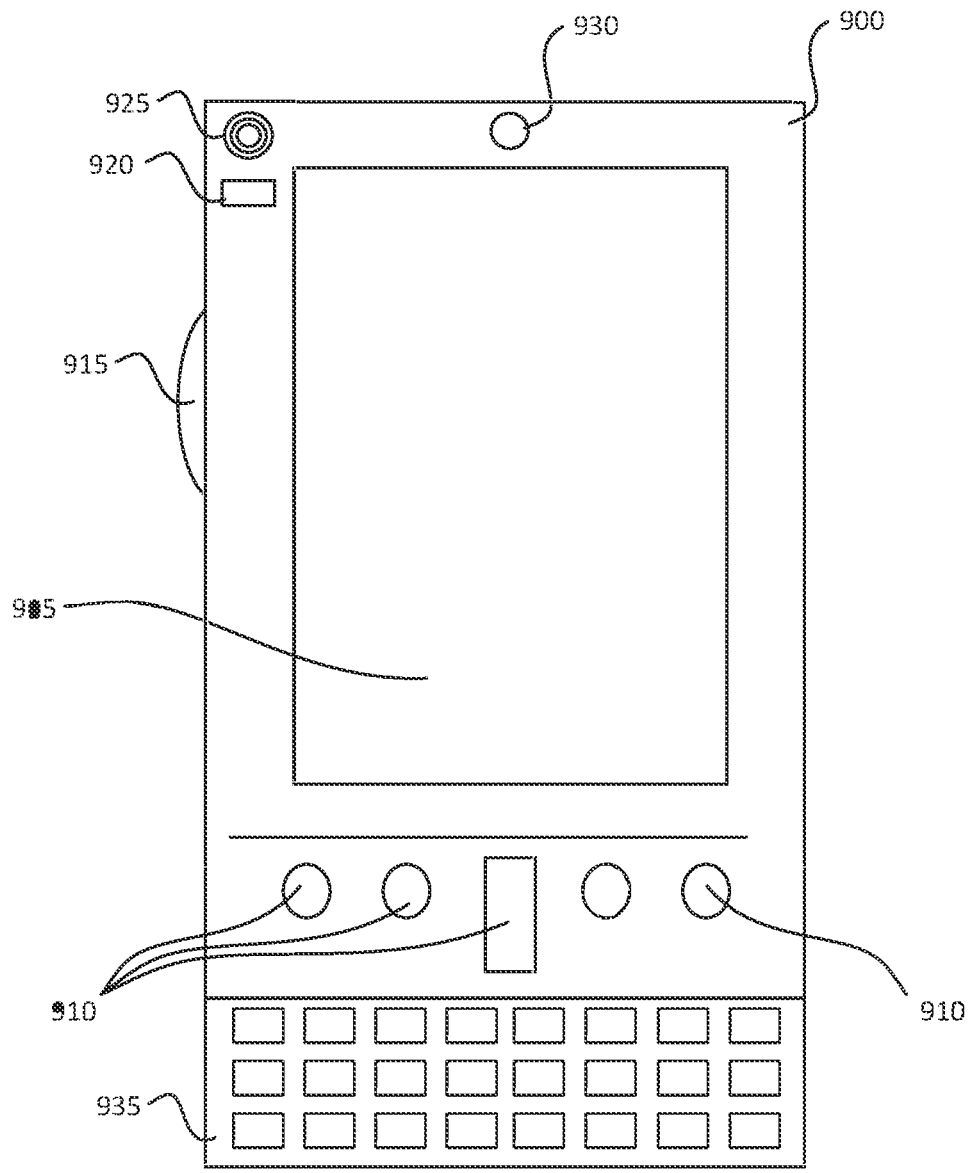
FIGS. 9A and 9B are simplified block diagrams of a mobile computing system in which aspects of the present disclosure may be practiced.
Figure 9B:
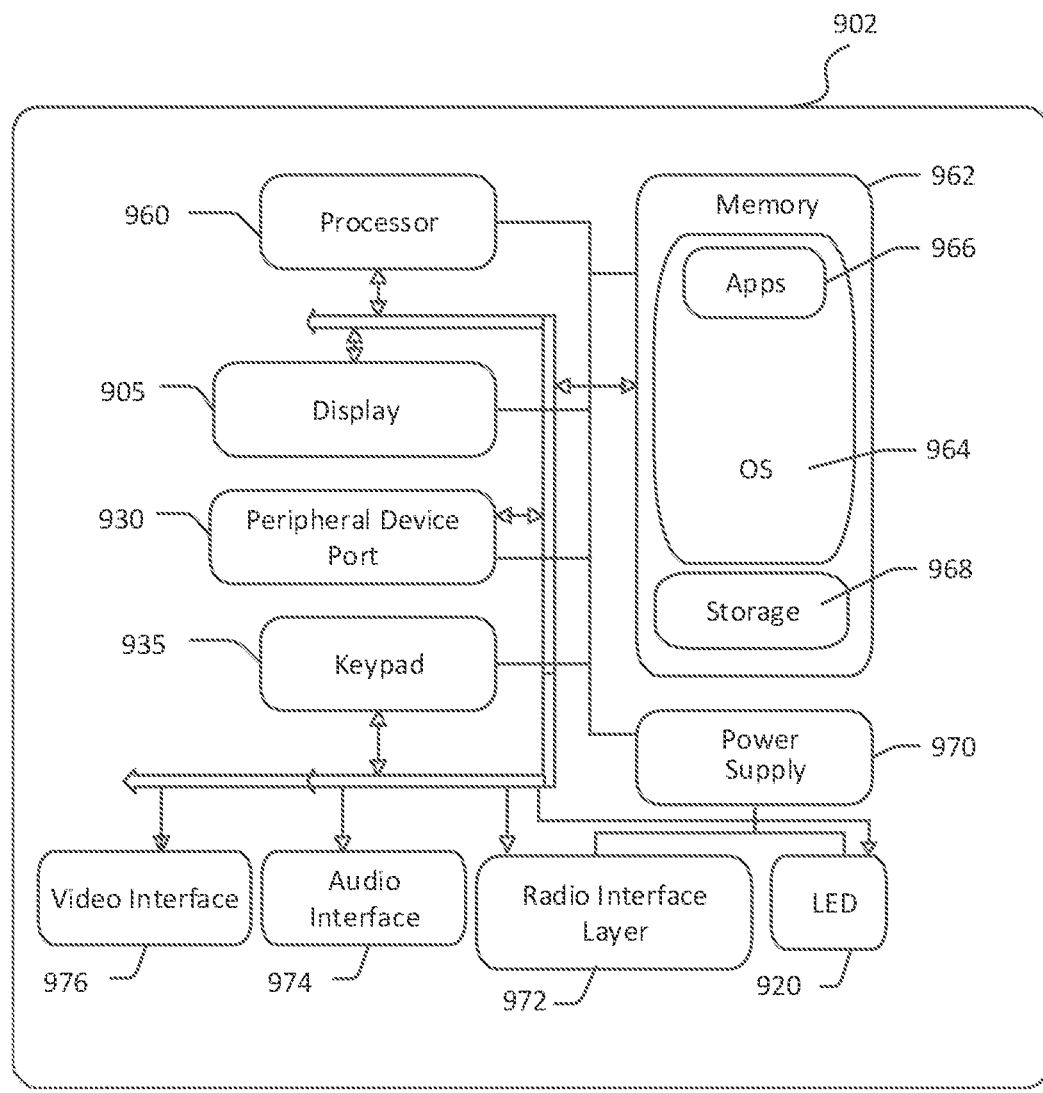

FIGS. 9A and 9B illustrate a mobile computing device 900, for example, a mobile telephone, a smart phone, wearable computer (such as a smart watch or head-mounted display for virtual reality applications), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including the instructions for automatically processing a message input and providing at least one intelligent action response according to the processing results as described herein (e.g., input manager 811, NLP manager 813, action response provider 815, and/or UX Component 817, etc.).

The system 902 has a power supply 970, which may be implemented as one or more batteries. The power supply 970 may further include an external power source, such as an AC adapter or a powered docking cradle that supplements or recharges the batteries. The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 925 (e.g., audio transducer 925 illustrated in FIG. 9A). In the illustrated embodiment, the visual indicator 920 is a light emitting diode (LED) and the audio transducer 925 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 9A and 9B are described for purposes of illustrating the present methods and systems and are not intended to limit the disclosure to a particular sequence of steps or a particular combination of hardware or software components.

Figure 10:
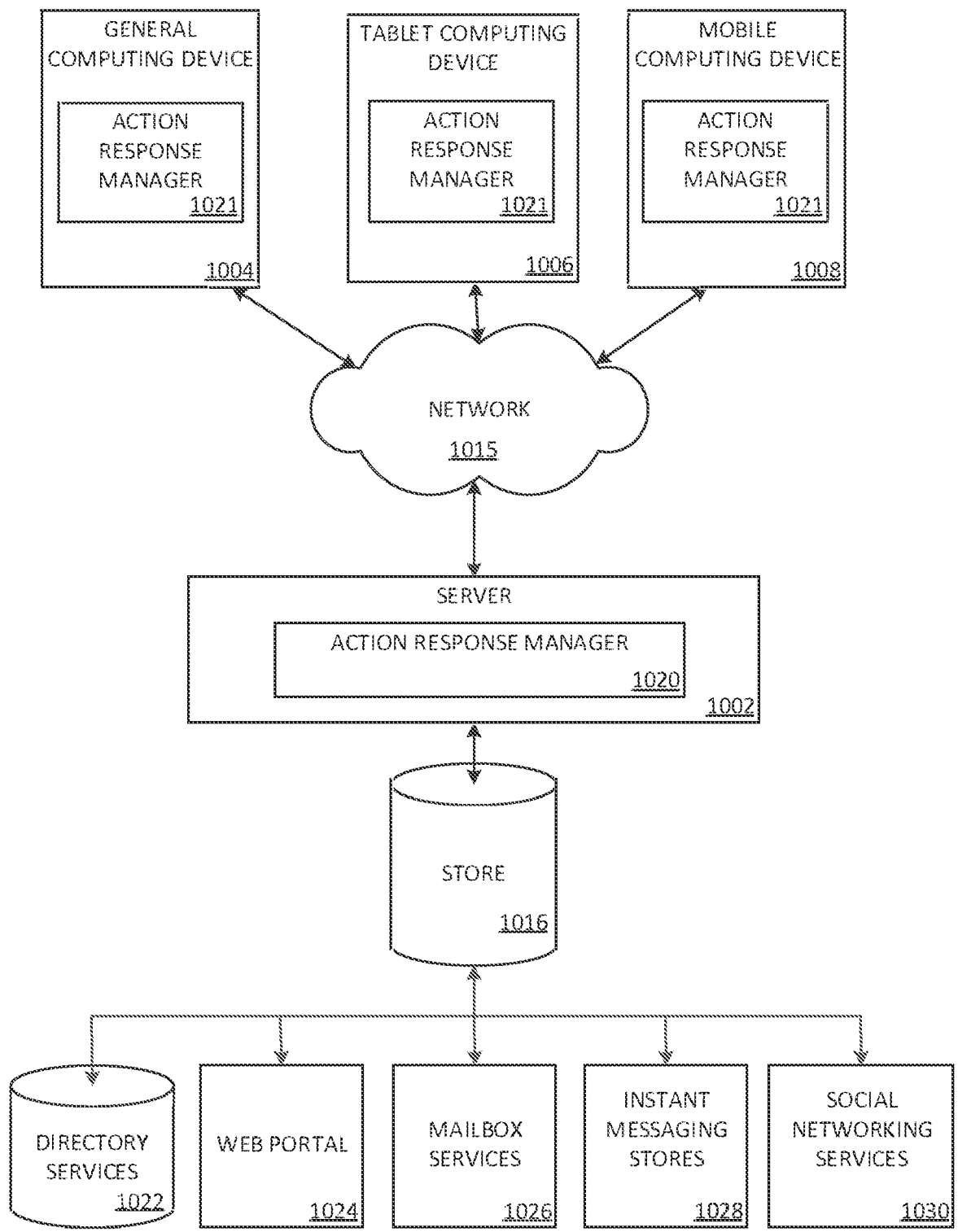
FIG. 10 is a simplified block diagram of a distributed computing system in which aspects of the present disclosure may be practiced.

FIG. 10 illustrates one aspect of the architecture of a system for processing data received at a computing system from a remote source, such as a general computing device 1004 (e.g., personal computer), tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking service 1030. The action response manager 1021 may be employed by a client that communicates with server device 1002, and/or the action response manager 1020 may be employed by server device 1002. The server device 1002 may provide data to and from a client computing device such as a general computing device 1004, a tablet computing device 1006 and/or a mobile computing device 1008 (e.g., a smart phone) through a network 1015. By way of example, the computer system described above with respect to FIGS. 1-9 may be embodied in a general computing device 1004 (e.g., personal computer), a tablet computing device 1006 and/or a mobile computing device 1008 (e.g., a smart phone). Any of these embodiments of the computing devices may obtain content from the store 1016, in addition to receiving graphical data useable to either be pre-processed at a graphic-originating system or post-processed at a receiving computing system.

As should be appreciated, FIG. 10 is described for purposes of illustrating the present methods and systems and is not intended to limit the disclosure to a particular sequence of steps or a particular combination of hardware or software components.

Figure 11:
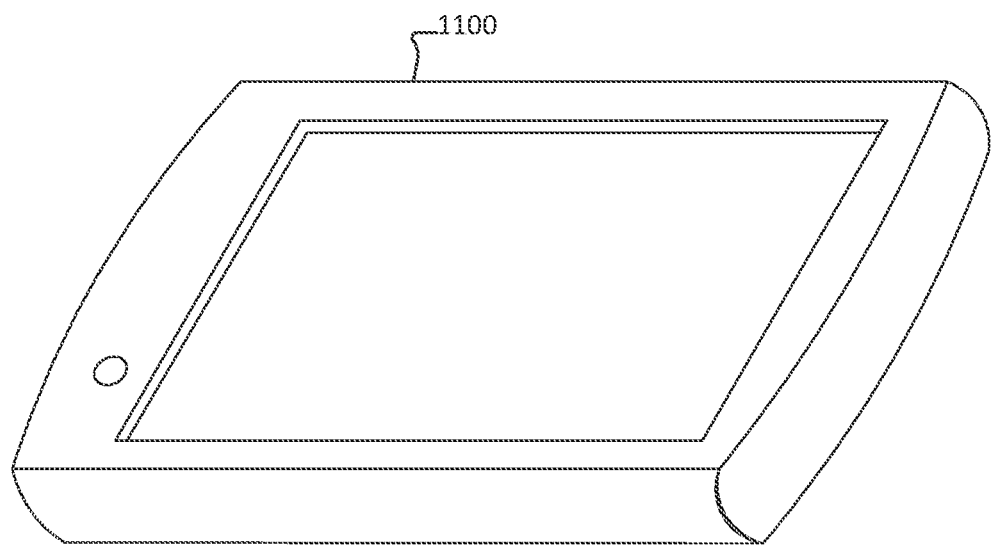
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 11 is described for purposes of illustrating the present methods and systems and is not intended to limit the disclosure to a particular sequence of steps or a particular combination of hardware or software components.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A processor-implemented method of providing action responses, comprising:
   detecting at least one portion of a message data received at a computing device;
   determining a set of action responses comprising at least an intelligent action response and a default action response, wherein each action response corresponds to the at least one portion of the message data, and wherein the intelligent action response is determined utilizing a database of historical message data;
   based on the set of action responses and data from the database containing historical message data, determining to provide, from among the set of action responses, the intelligent action response; and
   automatically providing the intelligent action response on the computing device.

2. The processor-implemented method of claim 1 further comprising, based at least in part on a present database of tokens, tokenizing the at least one portion of the message data.

3. The processor-implemented method of claim 2 further comprising highlighting, within a display of the at least one portion of the message data on the computing device, one or more tokens identified by tokenizing the at least one portion of the message data.

4. The processor-implemented method of claim 1, wherein determining to provide the intelligent action response comprises prioritizing the action responses within the set of action responses, and wherein automatically providing the intelligent action response on the computing device comprises providing a display of the intelligent action response as a prioritized suggestion over the default action response.

5. The processor-implemented method of claim 1, wherein the intelligent action response is determined utilizing prior conversational history, stored within the database of historical message data, between a user of the computing device and a sender of the message data.

6. The processor-implemented method of claim 1, wherein determining the set of action responses is based at least in part on a social profile for a user of the computing device.

7. The processor-implemented method of claim 1, wherein the at least one portion of the message data is text-based.

8. The processor-implemented method of claim 1, wherein the at least one portion of the message data is speech-based.

9. The processor-implemented method of claim 1, wherein automatically providing the intelligent action response on the computing device comprises providing the intelligent action response for display with a reply text box.

10. The processor-implemented method of claim 1, wherein the data from the database containing historical message data indicates action responses previously suggested to a user of the computing device and whether the action responses were accepted by the user.

11. A computer device comprising:
    at least one processing unit;
    at least one memory storing processor-executable instructions that, when executed by the at least one processing unit, cause the computer device to:
       detect at least one portion of a message data received at a computing device;
       determine a set of action responses comprising at least an intelligent action response and a default action response, wherein each action response corresponds to the at least one portion of the message data, and wherein the intelligent action response is determined utilizing a database of historical message data;
       based on the set of action responses and data from the database containing historical message data, determine to provide, from among the set of action responses, the intelligent action response; and
       automatically provide the intelligent action response on the computing device.

12. The computer device of claim 11, wherein determining to provide the intelligent action response comprises prioritizing the action responses within the set of action responses, and wherein automatically providing the intelligent action response on the computing device comprises providing a display of the intelligent action response as a prioritized suggestion over the default action response.

13. The computer device of claim 11, wherein the processor-executable instructions that, when executed by the at least one processing unit, cause the computer device further to:
    tokenize at least one portion of the message data; and
    highlight, within a display of the at least one portion of the message data on the computing device, one or more tokens identified by tokenizing.

14. The computer device of claim 11, wherein automatically providing the intelligent action response on the computing device comprises providing the intelligent action response for display with a reply text box.

15. The computer device of claim 11, wherein automatically providing the intelligent action response on the computing device comprises providing the intelligent action response for display as a pop-up element.

16. A computer storage medium storing instructions for executing, on one or more processors of a computer device, a method of providing action responses, the method comprising:
 detecting at least one portion of a message data received at a computing device;
 determining a set of action responses comprising at least an intelligent action response and a default action response, wherein each action response corresponds to the at least one portion of the message data, and wherein the intelligent action response is determined utilizing a database of historical message data;
 based on the set of action responses and data from the database containing historical message data, determining to provide, from among the set of action responses, the intelligent action response; and
 automatically providing the intelligent action response on the computing device.

17. The computer storage medium of claim 16, wherein the intelligent action response is determined utilizing prior conversational history, stored within the database of historical message data, between a user of the computing device and a sender of the message data.

18. The computer storage medium of claim 16, wherein the data from the database containing historical message data indicates action responses previously suggested to a user of the computing device and whether the action responses were accepted by the user.

19. The computer storage medium of claim 16, wherein automatically providing the intelligent action response on the computing device comprises one of providing the intelligent action response for display with a reply text box and providing the intelligent action response for display as a pop-up element.

20. The computer storage medium of claim 16, wherein detecting the at least one portion of a message data comprises detecting a user has highlighted the at least one portion of a message data.

* * * * *